US011283995B2

(12) United States Patent
Shidochi et al.

(10) Patent No.: US 11,283,995 B2
(45) Date of Patent: Mar. 22, 2022

(54) IMAGE DISPLAY APPARATUS

(71) Applicant: TOYOTA JIDOSHA KABUSHIKI KAISHA, Toyota (JP)

(72) Inventors: Yuka Shidochi, Toyota (JP); Goro Asai, Toyota (JP); Kunihiro Sugihara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/204,485

(22) Filed: Nov. 29, 2018

(65) Prior Publication Data
US 2019/0191081 A1 Jun. 20, 2019

(30) Foreign Application Priority Data
Dec. 20, 2017 (JP) .............................. JP2017-243705

(51) Int. Cl.
*H04N 5/232* (2006.01)
*H04N 5/247* (2006.01)
*H04N 5/262* (2006.01)
*B60R 1/00* (2006.01)
*G06T 7/00* (2017.01)

(52) U.S. Cl.
CPC ........... *H04N 5/23238* (2013.01); *B60R 1/00* (2013.01); *G06T 7/00* (2013.01); *H04N 5/232* (2013.01); *H04N 5/247* (2013.01); *H04N 5/2628* (2013.01); *B60R 2300/105* (2013.01); *B60R 2300/30* (2013.01); *B60R 2300/8066* (2013.01)

(58) Field of Classification Search
CPC .............................................. B60R 1/00–1207
See application file for complete search history.

(56) References Cited

U.S. PATENT DOCUMENTS

| 2002/0167589 | A1* | 11/2002 | Schofield | ............... | B60N 2/002 |
| | | | | | 348/148 |
| 2008/0007428 | A1 | 1/2008 | Watanabe et al. | | |
| 2008/0231703 | A1 | 9/2008 | Nagata et al. | | |
| 2009/0079585 | A1* | 3/2009 | Chinomi | ................... | B60R 1/04 |
| | | | | | 340/901 |

(Continued)

FOREIGN PATENT DOCUMENTS

| EP | 3037302 A1 | 6/2016 |
| JP | 2006-338566 A | 12/2006 |

(Continued)

*Primary Examiner* — Lindsay J Uhl
(74) *Attorney, Agent, or Firm* — Sughrue Mion, PLLC

(57) ABSTRACT

An image display apparatus has: a synthesizing device (132) for synthesizing a rear image (111B) captured by a rear imaging device (11B) for imaging rear area of a first vehicle (1) and a rear side image (111BL, 111BR) captured by a rear side imaging device (11BL, 11BR) for imaging rear side area of the first vehicle to generate a synthesized image (111C); and a display (14) for displaying the synthesized image. The synthesizing device varies a proportion of each of a rear image area and a rear side image area to the synthesized image based on velocity of the first vehicle and/or a distance between the first vehicle and a second vehicle existing at the rear of the first vehicle, wherein the rear image area and the rear side image area are areas in which the rear image and the rear side image are displayed, respectively, in the synthesized image.

9 Claims, 12 Drawing Sheets

(56) References Cited

U.S. PATENT DOCUMENTS

| | | |
|---|---|---|
| 2014/0055616 A1 | 2/2014 | Corcoran et al. |
| 2014/0277940 A1* | 9/2014 | VanVuuren ............... B60R 1/00 701/36 |
| 2019/0248288 A1* | 8/2019 | Oba ...................... G06T 3/0006 |
| 2020/0186755 A1* | 6/2020 | Miyagaki ................ B60R 1/006 |

FOREIGN PATENT DOCUMENTS

| | | | |
|---|---|---|---|
| JP | 2006338566 A | * | 12/2006 |
| JP | 2008-230558 A | | 10/2008 |
| JP | 2010-287163 A | | 12/2010 |

* cited by examiner

IMAGE DISPLAY APPARATUS

TECHNICAL FIELD

The present invention relates to a technical field of an image display apparatus that is configured to synthesize images that are captured by a plurality of imaging devices placed at a vehicle and to display the synthesized image, for example.

BACKGROUND ART

Each of a Patent Literature 1 and a Patent Literature 2 discloses one example of an image display apparatus. Specifically, the Patent Literature 1 discloses an image display apparatus that is configured to generate a synthesized image by synthesizing a rear side image (a rear and lateral image) that is captured by a camera configured to image a rear side area (a rear and lateral area) of a target vehicle and a rear image that is captured by a camera configured to image a rear area of the target vehicle seamlessly at the rear of the target vehicle so that the synthesized image is an image obtained by taking a view of the rear surroundings of the target vehicle from a virtual viewpoint and to display the generated synthesized image on a display apparatus of a vehicle interior mirror. The Patent Literature 2 discloses an image display apparatus that is configured to trim (crop) a rear right image that is captured by a camera configured to image a rear right area of a target vehicle and a rear left image that is captured by a camera configured to image a rear left area of the target vehicle on the basis of a distance between the target vehicle and a rear vehicle that travels at the rear of the target vehicle, to generate a synthesized image by synthesizing the trimmed rear left image and the trimmed rear right image and to display the generated synthesized image.

CITATION LIST

Patent Literature

[Patent Literature 1] Japanese Unexamined Patent Application Publication No. 2008-230558
[Patent Literature 2] Japanese Unexamined Patent Application Publication No. 2006-338566

SUMMARY OF INVENTION

Technical Problem

The image display apparatus disclosed in the Patent Literature 1 synthesizes the rear side image and the rear image without considering an existence of a rear vehicle that travels at the rear of the target vehicle. Therefore, the image display apparatus disclosed in the Patent Literature 1 has a technical problem that there is a possibility that the image display apparatus is not allowed to synthesize the rear side image and the rear image to generate the synthesized image in which a visibility of the rear vehicle is secured appropriately when there is the rear vehicle.

On the other hand, the image display apparatus disclosed in the Patent Literature 2 adjusts a trimmed amount of each of the rear right image and the rear left image so that the rear vehicle does not duplicate when the image display apparatus generates the synthesized image. However, visibility of the rear vehicle is not necessarily secured in the synthesized image only by adjusting the trimmed amount so that the rear vehicle does not duplicate. Thus, the image display apparatus disclosed in the Patent Literature 2 also has a technical problem that there is a possibility that the image display apparatus is not allowed to synthesize the rear right image and the rear left image to generate the synthesized image in which the visibility of the rear vehicle is secured appropriately when there is the rear vehicle.

The above described technical problem is one example of the technical problem to be solved by the present invention. It is therefore an object of the present invention to provide, for example, an image display apparatus that is configured to generate a synthesized image by synthesizing a plurality of images that are captured by a plurality of imaging devices placed at a first vehicle, respectively, and that is configured to generate the synthesized image in which a visibility of a second vehicle is secured appropriately when there is the second vehicle at the rear of the first vehicle.

Solution to Problem

A first aspect of an image display apparatus of the present invention is provided with: a synthesizing device that is configured to synthesize a rear image and a rear side image to generate a synthesized image, wherein the rear image is captured by a rear imaging device that is configured to image a rear area located at the rear of a first vehicle and the rear side image is captured by a rear side imaging device that is configured to image a rear side area located at the rear and the side of the first vehicle; and a displaying device that is configured to display the synthesized image, the synthesizing device is configured to vary a proportion of each of a rear image area and a rear side image area to the synthesized image on the basis of at least one of a velocity of the first vehicle and a distance between the first vehicle and a second vehicle that exists at the rear of the first vehicle, wherein the rear image area is an area in which the rear image is displayed in the synthesized image and the rear side image area is an area in which the rear side image is displayed in the synthesized image, when the synthesizing device generates the synthesized image.

A second aspect of an image display apparatus of the present invention is provided with: a synthesizing device that is configured to synthesize a rear image and a rear side image to generate a synthesized image, wherein the rear image is captured by a rear imaging device that is configured to image a rear area located at the rear of a first vehicle and the rear side image is captured by a rear side imaging device that is configured to image a rear side area located at the rear and the side of the first vehicle; and a displaying device that is configured to display the synthesized image, the synthesizing device is configured to vary an image angle of each of a first image part and a second image part on the basis of at least one of a velocity of the first vehicle and a distance between the first vehicle and a second vehicle that exists at the rear of the first vehicle, wherein the first image part is an image part that is one portion of the synthesized image and that corresponds to the rear image and the second image part is an image part that is one portion of the synthesized image and that corresponds to the rear side image, when the synthesizing device generates the synthesized image.

DESCRIPTION OF EMBODIMENTS

Hereinafter, with reference to drawings, one embodiment of the image display apparatus of the present invention will be described. In the following description, a vehicle 1 to which one embodiment of the image display apparatus of the present invention is adapted will be described.

(1) Structure of Vehicle 1

Figure 1:
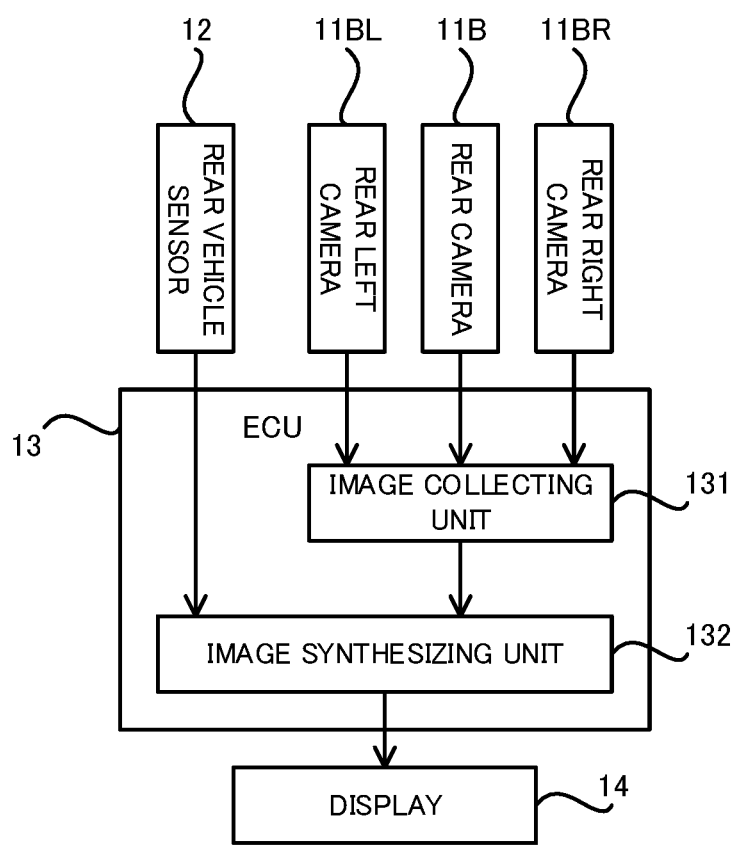
FIG. 1 is a block diagram that illustrates a structure of a vehicle in a present embodiment.
Figure 2A:
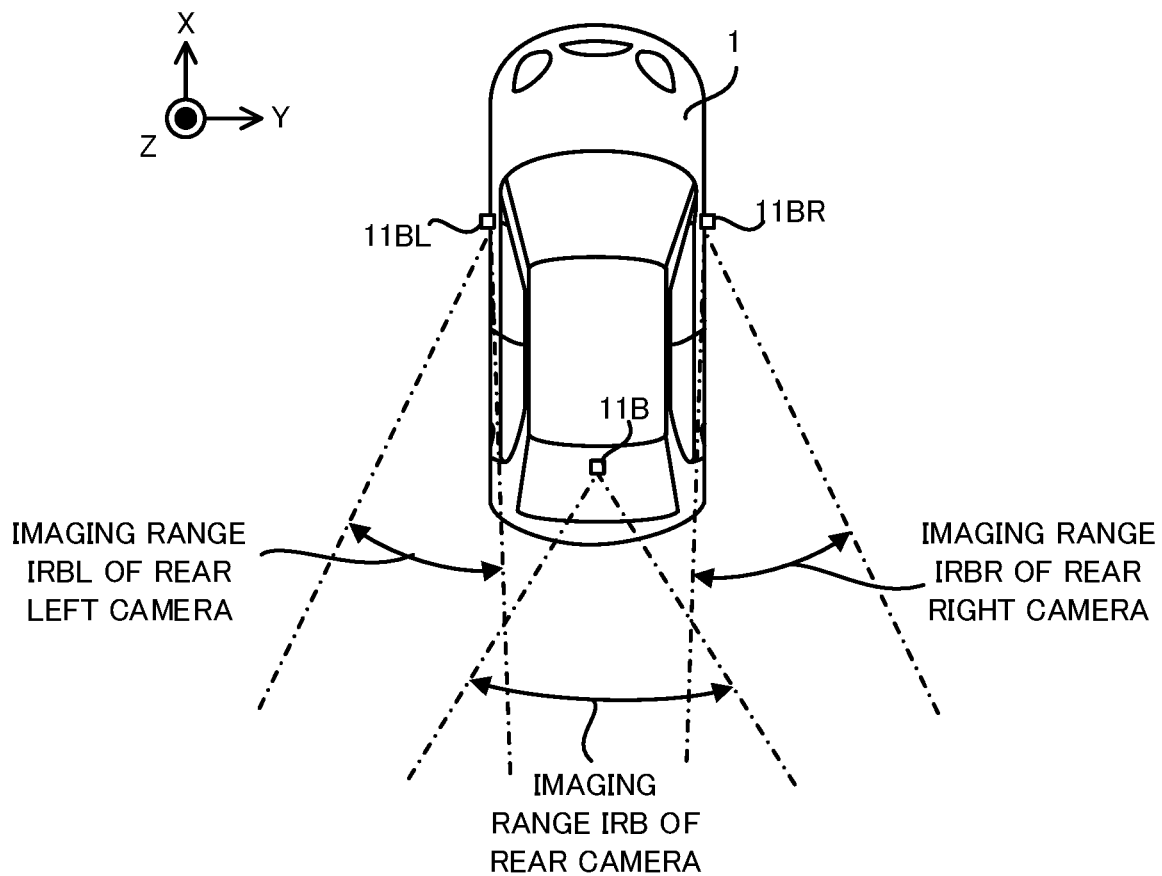
FIG. 2A is a planer view that illustrates positions at which a rear camera, a rear left camera and a rear right camera are placed, respectively, and an imaging range of each of the rear camera, the rear left camera and the rear right camera in the vehicle in the present embodiment.
Figure 2B:
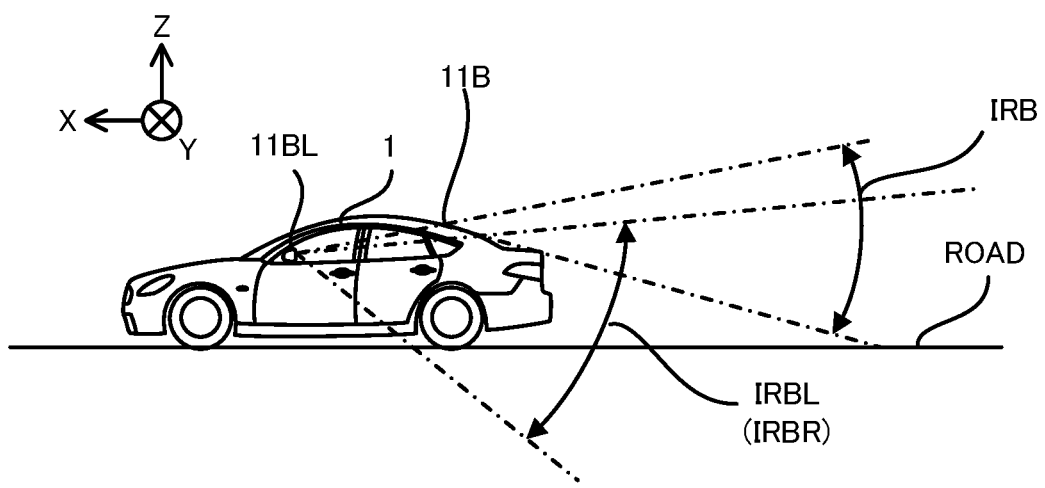
FIG. 2B is a side view that illustrates the positions at which the rear camera, the rear left camera and the rear right camera are placed, respectively, and the imaging range of each of the rear camera, the rear left camera and the rear right camera in the vehicle in the present embodiment.

Firstly, with reference to FIG. 1 and FIG. 2A to FIG. 2B, the structure of the vehicle 1 in the present embodiment will be explained. FIG. 1 is a block diagram that illustrates the structure of the vehicle 1 in a present embodiment. FIG. 2A is a planer view that illustrates positions at which a rear camera 11B, a rear left camera 11BL and a rear right camera 11BR are placed, respectively, and an imaging range of each of the rear camera 11B, the rear left camera 11BL and the rear right camera 11BR in the vehicle 1 in the present embodiment. FIG. 2B is a side view that illustrates the positions at which the rear camera 11B, the rear left camera 11BL and the rear right camera 11BR are placed, respectively, and the imaging range of each of the rear camera 11B, the rear left camera 11BL and the rear right camera 11BR in the vehicle 1 in the present embodiment. Note that the "right", the "left" and the "rear" mean the "right", the "left" and the "rear" based on a traveling direction of the vehicle 1, respectively, in the below described description, if there is no annotation. Moreover, in the below described description, the embodiment will be described by using an XYZ coordinate system in which rightward corresponds to "toward +Y direction", leftward corresponds to "toward −Y direction", backward (rearward) corresponds to "toward −X direction", frontward corresponds to "toward +X direction", upward corresponds to "toward +Z direction", and downward corresponds to "toward −Z direction".

As illustrated in FIG. 1, the vehicle 1 has: the rear camera 11B that is one example of a "rear imaging device" or a "rear imager" in a below described additional statement; the rear left camera 11BL that is one example of a "rear side imaging device" or a "rear side imager" in the below described additional statement; the rear right camera 11BR that is one example of the "rear side imaging device" or the "rear side imager" in the below described additional statement; a rear vehicle sensor 12; an ECU (Electronic Control Unit) 13 that is one example of the "controller" in the below described additional statement; and a display 14 that is one example of a "displaying device" or a "display" in the below described additional statement.

The rear camera 11B is an imaging device that is configured to image (in other words, capture an image of) a rear area located at the rear (especially, just at the rear) of the vehicle 1 (namely, located at a backward position viewed from the vehicle 1), as illustrated in FIG. 2A and FIG. 2B. The rear area corresponds to an area including at least one portion of an area that is reflected in a back mirror, under the assumption that the back mirror is placed in the vehicle interior (in other words, a cabin) of the vehicle 1. Namely, the rear camera 11B is used as a substitute of the back mirror placed at the vehicle interior of the vehicle 1 and constitutes one portion of what we call an electronic mirror, in the present embodiment. An imaging center of the rear camera 11B is just at the rear of the vehicle 1, in order to image the rear area of the vehicle 1. Namely, an optical axis of an optical system such as a lens of the rear camera 11B extends backwardly and straightforwardly from the vehicle 1. As a result, an imaging range (in other words, an angle of an imaging field) IRB that is imaged by the rear camera 11B is set to include the rear area.

The rear left camera 11BL is an imaging device that is configured to image a rear left area located at the rear of the vehicle 1 (especially, at the rear of the vehicle 1 and at the left of the vehicle 1, namely, at a backward and leftward position viewed from the vehicle 1), as illustrated in FIG. 2A and FIG. 2B. The rear left area corresponds to an area including at least one portion of an area that is reflected in a door mirror placed at a left door when the left door is in the closed state (in other words, the left door is closed), under the assumption that the door mirror is placed at the left door of the vehicle 1 that is placed at the left side of the vehicle 1. Namely, the rear left camera 11BL is used as a substitute of the door mirror placed at the left door of the vehicle 1 and constitutes one portion of what we call an electronic mirror, in the present embodiment. An imaging center of the rear left camera 11BL is at the left of vehicle 1 and at the rear of the vehicle 1, in order to image the rear left area of the vehicle 1. In other words, the imaging center of the rear left camera 11BL is at the left of the imaging center of the rear camera 11B. Namely, an optical axis of an optical system such as a lens of the rear left camera 11BL extends backward at the left of the above described optical axis of the optical system of the rear camera 11B. As a result, an imaging range (in other words, angle of imaging field) IRBL that is imaged by the rear left camera 11BL is set to include the rear left area. Note that the imaging range IRBL may overlaps partially with the imaging range IRB.

The rear right camera 11BR is an imaging device that is configured to image a rear right area located at the rear of the vehicle 1 (especially, at the rear of the vehicle 1 and at the right of the vehicle 1, namely, at a backward and rightward position viewed from the vehicle 1), as illustrated in FIG. 2A and FIG. 2B. The rear right area corresponds to an area including at least one portion of an area that is reflected in a door mirror placed at a right door when the right door is in a closed state (in other words, the right door is closed), under the assumption that the door mirror is placed at the right door of the vehicle 1 that is placed at the right side of the vehicle 1. Namely, the rear right camera 11BR is used as a substitute of the door mirror placed at the right door of the vehicle 1 and constitutes one portion of what we call an electronic mirror, in the present embodiment. An imaging center of the rear right camera 11BR is at the right of vehicle 1 and at the rear of the vehicle 1, in order to image the rear right area of the vehicle 1. In other words, the imaging center of the rear right camera 11BR is at the right of the imaging center of the rear camera 11B. Namely, an optical axis of an optical system such as a lens of the rear right camera 11BR extends backward at the right of the above described optical axis of the optical system of the rear camera 11B. As a result, an imaging range (in other words, an angle of an imaging field) IRBR that is imaged by the rear right camera 11BR is set to include the rear right area. Note that the imaging range IRBR may overlaps partially with the imaging range IRB.

The rear vehicle sensor 12 is a detecting device that is configured to detect another vehicle 2 that is located at the rear of the vehicle 1 (here, "at the rear of the vehicle 1" means a position in the rear area imaged by the rear camera 11B (in other words, a position in the imaging range IRB), same applies to the following description). Hereinafter, another vehicle 2 is referred to as a "rear vehicle 2". The rear vehicle sensor 12 includes at least one of a radar, a LIDAR (Light Detection and Ranging) and a camera, for example. Note that at least one of the rear camera 11B, the rear left camera 11BL and the rear right camera 11BR may be used as the rear vehicle sensor 12.

The ECU 13 is configured to control entire operation of the vehicle 1. Especially in the present embodiment, the ECU 13 is configured to execute an image display operation for displaying, at the display 14, a rear image 111B, a rear left image 111BL and a rear right image 111BR. The rear image 111B is an image that is captured by the rear camera 11B (namely, an image indicating a circumstance of the rear area). The rear left image 111BL is an image that is captured by the rear left camera 11BL (namely, an image indicating a circumstance of the rear left area). The rear right image 111BR is an image that is captured by the rear right camera 11BR (namely, an image indicating a circumstance of the rear right area). In order to perform the image display operation, the ECU 13 includes, as processing blocks that are logically realized in the ECU 13, an image collecting unit 131 and an image synthesizing unit 132 that is one example of a "synthesizing device" in the below described additional statement.

The image collecting unit 131 is configured to collect the rear image 111B, the rear left image 111BL and the rear right image 111BR from the rear camera 11B, the rear left camera 11BL and the rear right camera 11BR, respectively.

Figure 3:
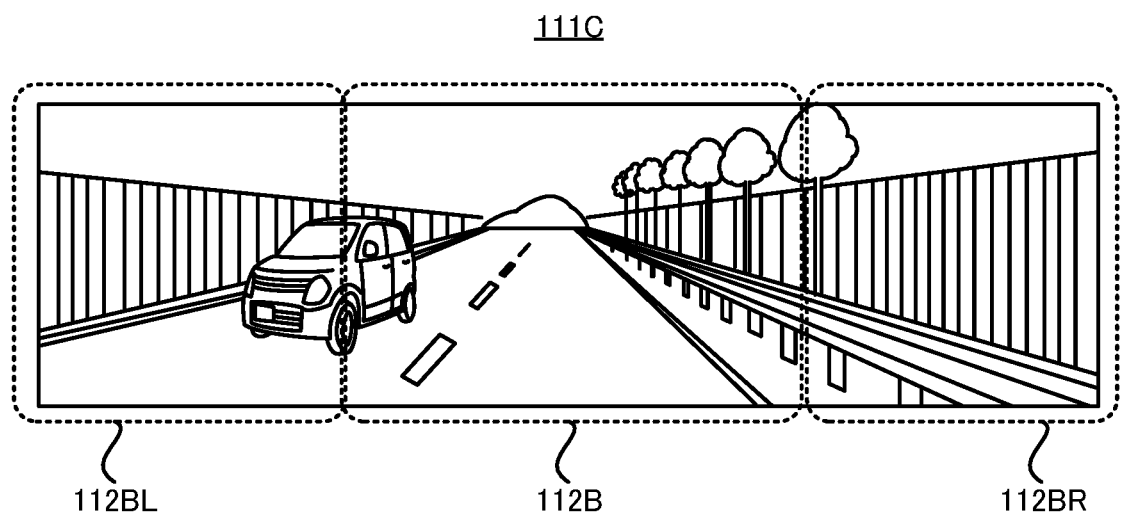
FIG. 3 is a planar view that illustrates a synthesized image generated by an image synthesizing process in the present embodiment.

The image synthesizing unit 132 is configured to generate a synthesized image 111C by executing an image synthesizing process for synthesizing the rear image 111B, the rear left image 111BL and the rear right image 111BR. Specifically, the image synthesizing unit 132 is configured to extract, from the rear image 111B, a rear image 112B corresponding to an image part that is at least one portion of the rear image 111B by trimming (in other words, cropping) the rear image 111B. Moreover, the image synthesizing unit 132 is configured to extract, from the rear left image 111BL, a rear left image 112BL corresponding to an image part that is at least one portion of the rear left image 111BL by trimming the rear left image 111BL. Moreover, the image synthesizing unit 132 is configured to extract, from the rear right image 111BR, a rear right image 112BR corresponding to an image part that is at least one portion of the rear right image 111BR by trimming the rear right image 111BR. Then, the image synthesizing unit 132 is configured to generate the synthesized image 111C in which the rear left area is located on the left of the rear area and the rear right area is located on the right of the rear area. Namely, the image synthesizing unit 132 is configured to generate the synthesized image 111C in which the rear left image 112BL is located on the left of the rear image 112B and the rear right image 112BR is located on the right of the rear image 112B, as illustrated in FIG. 3.

Furthermore, the image synthesizing unit 132 is configured to control the display 14 to display the generated synthesized image 111C. Note that the display 14 is placed in the vehicle interior of the vehicle 1 and is configured to display the synthesized image 111C to an occupant (in other words, a person or a driver) of the vehicle 1 in the vehicle interior.

(2) Flow of Image Display Operation

Figure 4:
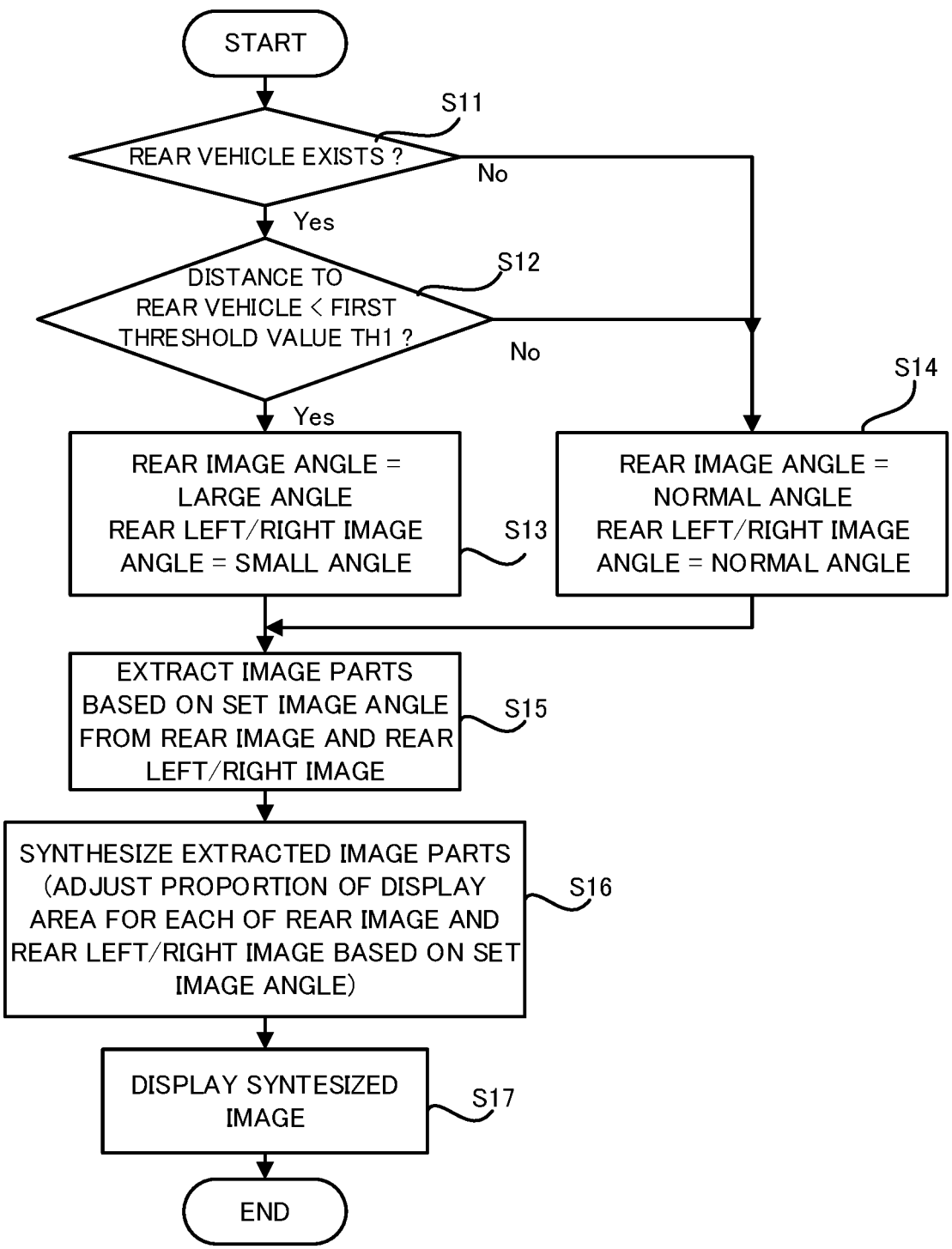
FIG. 4 is a flowchart that illustrates a flow of an image display operation in the present embodiment.

Next, with reference to FIG. 4, a flow of the image display operation in the present embodiment will be described in detail. FIG. 4 is a flowchart that illustrates the flow of the image display operation in the present embodiment.

As illustrated in FIG. 4, the image synthesizing unit 132 determines on the basis of a detected result of the rear vehicle sensor 12 whether or not the rear vehicle 2 exists (a step S11). Namely, the image synthesizing unit 132 determines whether or not the rear vehicle 2 is detected by the rear vehicle sensor 12.

As a result of the determination at the step S11, if it is determined that the rear vehicle 2 does not exist (namely, the rear vehicle 2 is not detected by the rear vehicle sensor 12)

(the step S11: No), the image synthesizing unit 132 sets a rear image angle θB that is a parameter relating to the rear image 112B to a predetermined normal image angle θB_N (a step S14). Moreover, the image synthesizing unit 132 sets a rear left image angle θBL that is a parameter relating to the rear left image 112BL to a predetermined normal image angle θBL_N (the step S14). Moreover, the image synthesizing unit 132 sets a rear right image angle θBR that is a parameter relating to the rear right image 112BR to a predetermined normal image angle θBR_N (the step S14).

Figure 5:
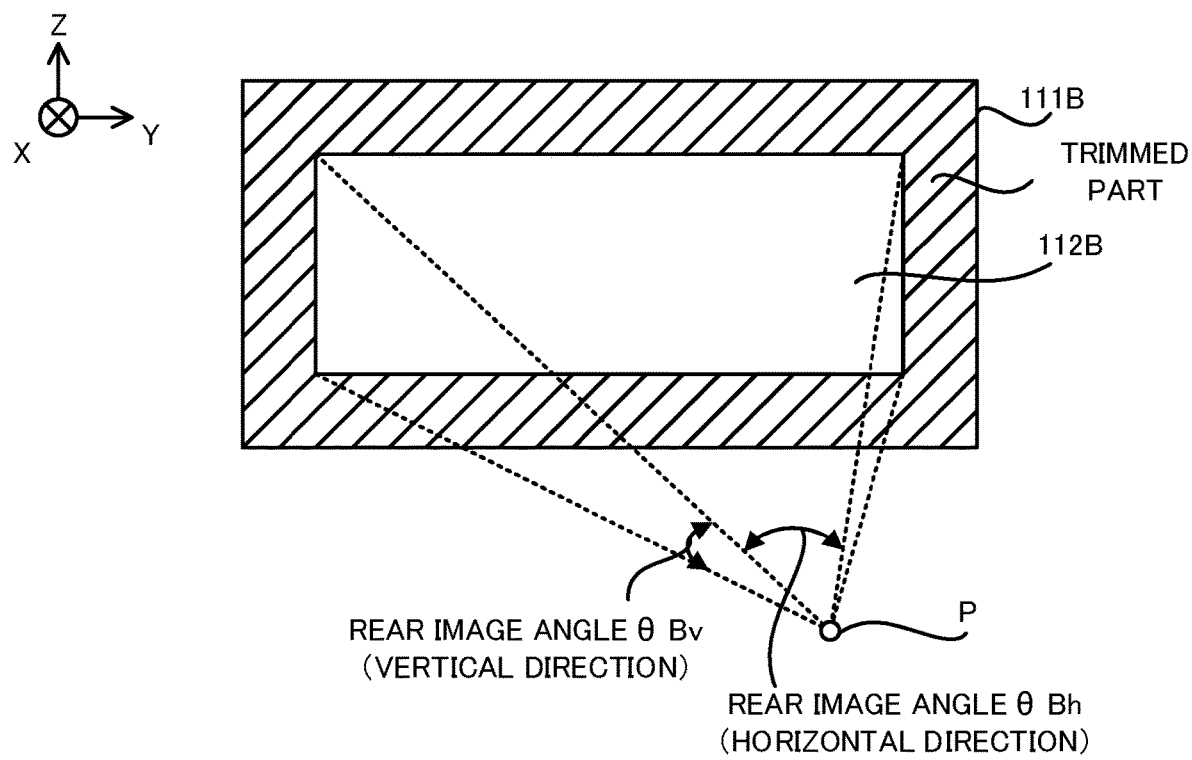
FIG. 5 is a planar view that conceptually illustrates a rear image angle.

The rear image angle θB is a parameter that represents, as an angle from a virtual viewpoint, an extracted area of the rear image 112B in the rear image 111B (namely, an area in the rear image 111B from which the rear image 112B is extracted). In other words, the rear image angle θB is a parameter that represents, as the angle from the virtual viewpoint, a range of a scene included in the rear image 112B. Specifically, as illustrated in FIG. 5, the rear image 112B corresponds to an image part that is at least one portion of the rear image 111B. Namely, the rear image 112B corresponds to a residual image part after at least one portion of the rear image 111B is trimmed. The extracted area of the rear image 112B (namely, the range of the scene in the rear image 112B) can be expressed by an angle between virtual lines or virtual planes that extend from the virtual viewpoint P to an outer edge of the extracted area. This angle corresponds to the rear image angle θB. As illustrated in FIG. 5, the rear image angle θB typically includes an angle (namely, an angle in the horizontal direction) θBh between virtual lines or virtual planes that extend from the virtual viewpoint P to a pair of vertical outer edges of the extracted area of the rear image 112B and an angle (namely, an angle in the vertical direction) θBv between virtual lines or virtual planes that extend from the virtual viewpoint P to a pair of horizontal outer edges of the extracted area of the rear image 112B. In the present embodiment, the rear image angle θB means the rear image angle θBh that corresponds to the horizontal angle. However, the rear image angle θB may mean the rear image angle θBv that corresponds to the vertical angle, in addition to or instead of the rear image angle θBh. When the rear image angle θB means both of the rear image angle θBh and the rear image angle θBv, a process of setting the rear image angle θB to the normal image angle θB_N at the step S14 includes a process of setting the rear image angle θBh to the normal image angle θBh_N that corresponds to the horizontal angle and a process of setting the rear image angle θBv to the normal image angle θBv_N that corresponds to the vertical angle.

Same applies to the rear left image angle θBL and the rear right image angle θBR, as with the rear image angle θB. Namely, the rear left image angle θBL is a parameter that represents, as an angle (an angle in the horizontal direction in the present embodiment) from the virtual viewpoint, an extracted area of the rear left image 112BL in the rear left image 111BL (in other words, a range of a scene included in the rear left image 112BL). Similarly, the rear right image angle θBR is a parameter that represents, as an angle (an angle in the horizontal direction in the present embodiment) from the virtual viewpoint, an extracted area of the rear right image 112BR in the rear right image 111BR (in other words, a range of a scene included in the rear right image 112BR).

On the other hand, as a result of the determination at the step S11, if it is determined that the rear vehicle 2 exists (namely, the rear vehicle 2 is detected by the rear vehicle sensor 12) (the step S11: Yes), the image synthesizing unit 132 further determines whether or not a distance from the vehicle 1 to the rear vehicle 2 is shorter than a predetermined threshold value TH1 (a step S12). Hereinafter, the distance from the vehicle 1 to the rear vehicle 2 is referred to as an "inter-vehicular distance L12".

As a result of the determination at the step S12, if it is determined that the inter-vehicular distance L12 is longer than the threshold value TH1 (the step S12: No), the image synthesizing unit 132 sets the rear image angle θB to the normal image angle θB_N, sets the rear left image angle θBL to the normal image angle θBL_N and sets the rear right image angle θBR to the normal image angle θBR_N (the step S14).

On the other hand, as a result of the determination at the step S12, if it is determined that the inter-vehicular distance L12 is shorter than the threshold value TH1 (the step S12: Yes), the image synthesizing unit 132 sets the rear image angle θB to a predetermined large image angle (in other words, a wide image angle) θB_L that is larger (in other words, wider) than the normal image angle θB_N (a step S13). Moreover, the image synthesizing unit 132 sets the rear left image angle θBL to a predetermined small image angle (in other words, a narrow image angle) θBL_S that is smaller (in other words, narrower) than the normal image angle θBL_N (the step S13). Moreover, the image synthesizing unit 132 sets the rear right image angle θBR to a predetermined small image angle θBR_S that is smaller than the normal image angle θBR_N (the step S13).

Note that the threshold value TH1 is used to determine (i) whether the rear image angle θB is set to the normal image angle θB_N or the large image angle θB_L, (ii) whether the rear left image angle θBL is set to the normal image angle θBL_N or the small image angle θBL_S and (iii) whether the rear right image angle θBR is set to the normal image angle θBR_N or the small image angle θBR_S. Thus, the threshold value TH1 is set to an appropriate value that allows the image synthesizing unit 132 to distinguish, on the basis of the inter-vehicular distance L12, a state where the rear image angle θB, the rear left image angle θBL and the rear right image angle θBR are preferably set to the normal image angle θB_N, the normal image angle θBL_N and the normal image angle θBR_N, respectively, from a state where the rear image angle θB, the rear left image angle θBL and the rear right image angle θBR are preferably set to the large image angle θB_L, the small image angle θBL_S and the small image angle θBR_S.

Figure 6A:
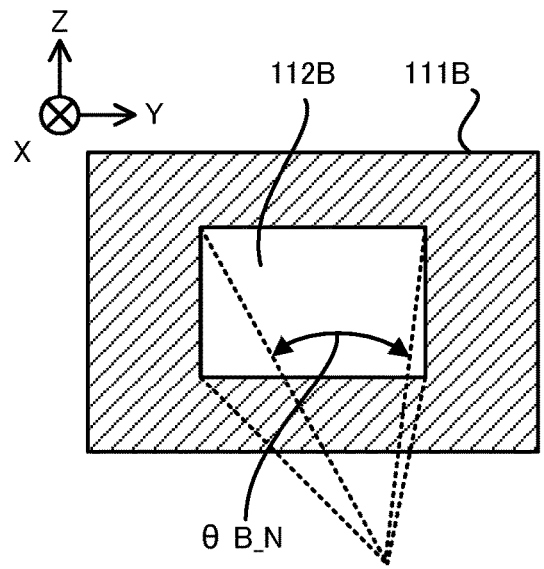
FIG. 6A is a planar view that illustrates a rear image corresponding to a normal image angle.
Figure 6B:
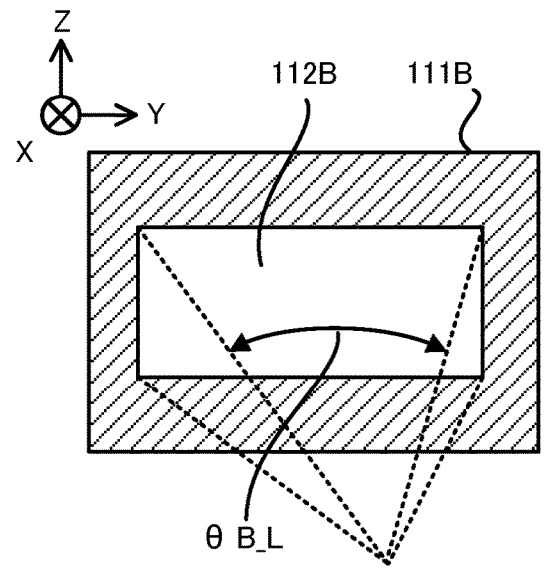
FIG. 6B is a planar view that illustrates the rear image corresponding to a large image angle.

Then, the image synthesizing unit 132 extracts, as the rear image 112B, an image part corresponding to the rear image angle θB set at the step S13 or the step S14 from the rear image 111B (a step S15). For example, when the rear image angle θB is set to the normal image angle θB_N, the image synthesizing unit 132 extracts, as the rear image 112B, a relatively small image part corresponding to the normal image angle θB_N from the rear image 111B, as illustrated in FIG. 6A. For example, when the rear image angle θB is set to the large image angle θB_L, the image synthesizing unit 132 extracts, as the rear image 112B, a relatively large image part corresponding to the large image angle θB_L from the rear image 111B, as illustrated in FIG. 6B.

Figure 7A:
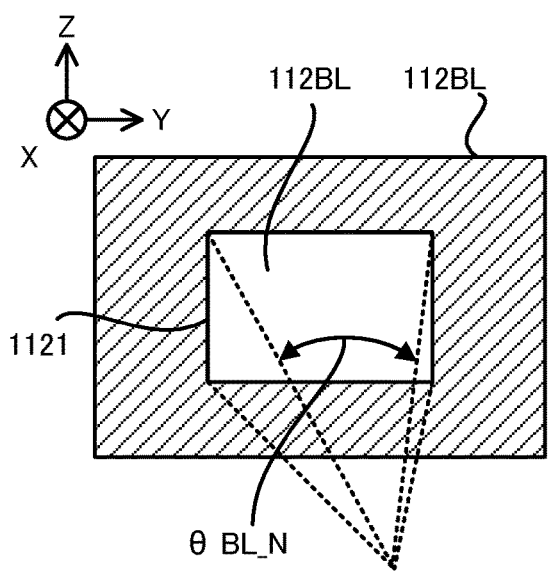
FIG. 7A is a planar view that illustrates a rear left image corresponding to a normal image angle.
Figure 7B:
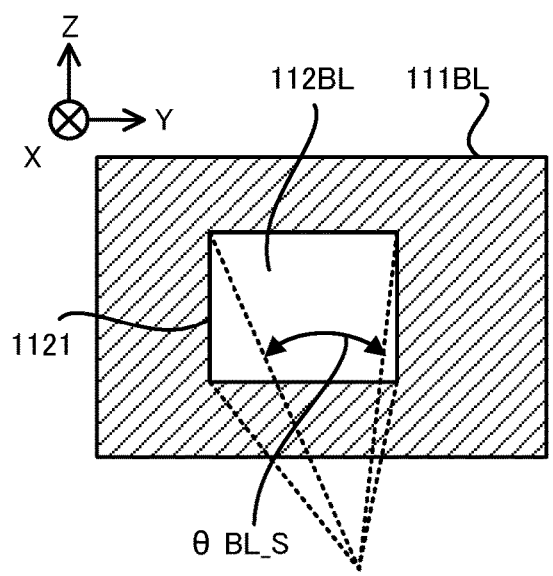
FIG. 7B is a planar view that illustrates the rear left image corresponding to a small image angle.

Moreover, the image synthesizing unit 132 extracts, as the rear left image 112BL, an image part corresponding to the rear left image angle θBL set at the step S13 or the step S14 from the rear left image 111BL (the step S15). Moreover, the image synthesizing unit 132 extracts, as the rear right image 112BR, an image part corresponding to the rear right image angle θBR set at the step S13 or the step S14 from the rear right image 111BR (the step S15). For example, when the rear left image angle θBL is set to the normal image angle θBL_N, the image synthesizing unit 132 extracts, as the rear left image 112BL, a relatively large image part corresponding to the normal image angle θBL_N from the rear left image 111BL, as illustrated in FIG. 7A. For example, when the rear left image angle θBL is set to the small image angle θBL_N, the image synthesizing unit 132 extracts, as the rear left image 112BL, a relatively small image part corresponding to the small image angle θBL_S from the rear left image 111BL, as illustrated in FIG. 7B. It is preferable that the image synthesizing unit 132 extract the rear left image 112BL so that a position of a left side 112l (namely, a side opposite to a right side that forms a boundary with the rear image 112B) of the rear left image 112BL corresponding to the normal image angle θBL_N is same as a position of the left side 112l of the rear left image 112BL corresponding to the small image angle θBL_S in the rear left image 111BL. Similarly, it is preferable that the image synthesizing unit 132 extract the rear right image 112BR so that a position of a right side (namely, a side opposite to the left side that forms a boundary with the rear image 112B) of the rear right image 112BR corresponding to the normal image angle θBR_N is same as a position of the right side of the rear right image 112BR corresponding to the small image angle θBR_S in the rear right image 111BR.

Then, the image synthesizing unit 132 generates the synthesized image 111C in which the rear left image 112BL is located on the left of the rear image 112B and the rear right image 112BR is located on the right of the rear image 112B by using the rear image 112B, the rear left image 112BL and the rear right image 112BR extracted at the step S15 (a step S16). Note that the image synthesizing unit 132 may execute, as one portion of the image synthesizing process, at least one of an observing point converting process, an image rotating process, a scaling process and an image shape forming process so that the rear image 112B, the rear left image 112BL and the rear right image 112BR are seamlessly connected in the synthesizing image 111C when the image synthesizing unit 132 generates the synthesized image 111C. The observing point converting process is a process for converting an observing point (in other words, a viewpoint) of at least one of the rear image 111B, the rear image 112B, the rear left image 111BL, the rear left image 112BL, the rear right image 111BR and the rear right image 112BR. The image rotating process is a process for rotating at least one of the rear image 111B, the rear image 112B, the rear left image 111BL, the rear left image 112BL, the rear right image 111BR and the rear right image 112BR. The scaling process is a process for scaling (in other words, expanding and/or minifying) at least one of the rear image 111B, the rear image 112B, the rear left image 111BL, the rear left image 112BL, the rear right image 111BR and the rear right image 112BR. The image shape forming process is a process for converting (changing) a shape of at least one of the rear image 111B, the rear image 112B, the rear left image 111BL, the rear left image 112BL, the rear right image 111BR and the rear right image 112BR.

Figure 8A:
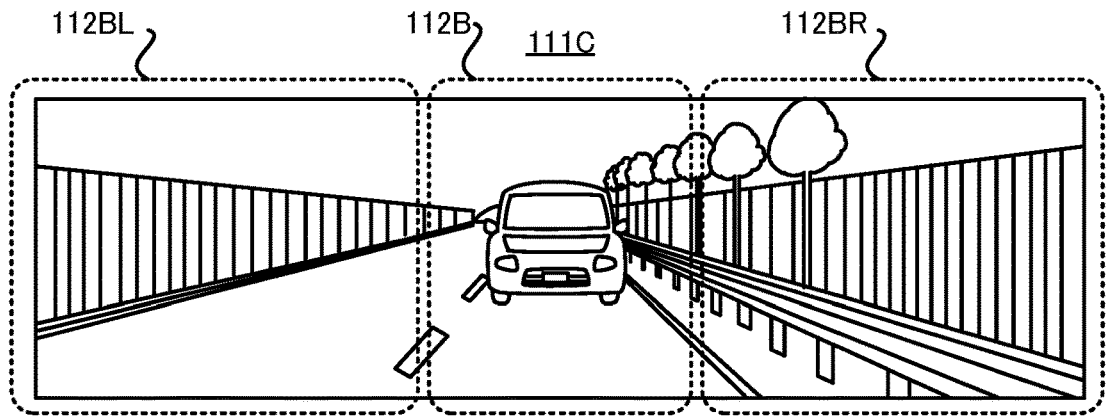
FIG. 8A is a planar view that illustrates one example of a synthesized image generated when a rear vehicle does not exist or a distance to the rear vehicle is longer than a first threshold value.
Figure 8B:
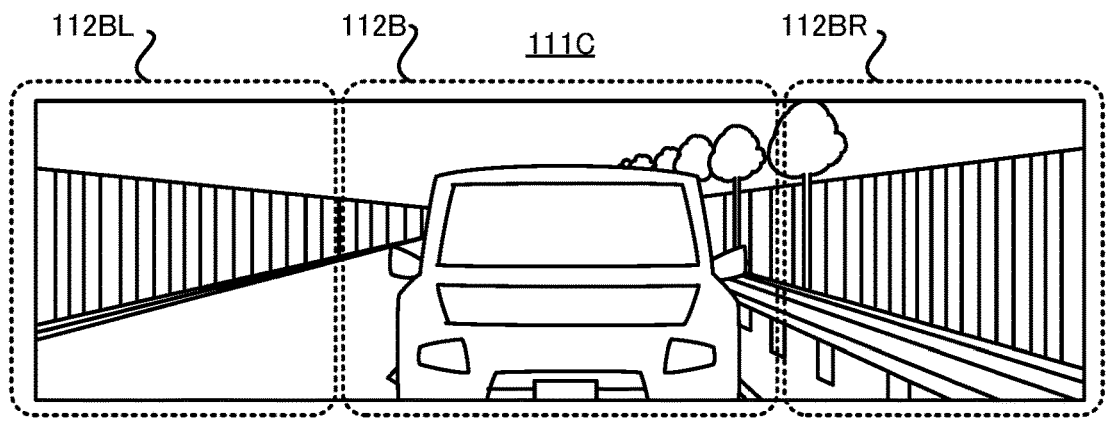
FIG. 8B is a planar view that illustrates one example of the synthesized image generated when the distance to the rear vehicle is shorter than the first threshold value.

The rear image 112B when the rear image angle θB is set to the large image angle θB_L is larger than the rear image 112B when the rear image angle θB is set to the normal image angle θB_N. Thus, the image synthesizing unit 132 generates the synthesized image 111C so that a proportion of an area of the rear image 112B to the synthesized image 111C (in other words, a proportion of a rear image area to the synthesized image 111C, wherein the rear image area is one portion of the synthesized image 111C and is an area in which the rear image 112B is displayed) when the rear image angle θB is set to the large image angle θB_L is larger than the proportion when the rear image angle θB is set to the normal image angle θB_N. Namely, the image synthesizing unit 132 generates the synthesized image 111C so that the proportion of the area of the rear image 112B to the synthesized image 111C becomes larger as the rear image angle θB becomes larger. On the other hand, the rear left image 112BL when the rear left image angle θBL is set to the small image angle θBL_S is smaller than the rear left image 112BL when the rear left image angle θBL is set to the normal image angle θBL_N. Moreover, the rear right image 112BR when the rear right image angle θBR is set to the small image angle θBR_S is smaller than the rear right image 112BR when the rear right image angle θBR is set to the normal image angle θBR_N. Thus, the image synthesizing unit 132 generates the synthesized image 111C so that a proportion of an area of the rear left image 112BL to the synthesized image 111C (in other words, a proportion of a rear left image area to the synthesized image 111C, wherein the rear left image area is one portion of the synthesized image 111C and is an area in which the rear left image 112BL is displayed) when the rear left image angle θBL is set to the small image angle θBL_S is smaller than the proportion when the rear left image angle θBL is set to the normal image angle θBL_N. Moreover, the image synthesizing unit 132 generates the synthesized image 111C so that a proportion of an area of the rear right image 112BR to the synthesized image 111C (in other words, a proportion of a rear right image area to the synthesized image 111C, wherein the rear right image area is one portion of the synthesized image 111C and is an area in which the rear right image 112BR is displayed) when the rear right image angle θBR is set to the small image angle θBR_S is smaller than the proportion when the rear right image angle θBR is set to the normal image angle θBR_N. Namely, the image synthesizing unit 132 generates the synthesized image 111C so that the proportion of the area of the rear left image 112BL to the synthesized image 111C becomes smaller as the rear left image angle θBL becomes smaller and the proportion of the area of the rear right image 112BR to the synthesized image 111C becomes smaller as the rear right image angle θBR becomes smaller. Note that FIG. 8A illustrates one example of the synthesized image 111C generated when the rear image angle θB, the rear left image angle θBL and the rear right image angle θBR are set to the normal image angle θB_N, the normal image angle θBL_N and the normal image angle θBR_N, respectively (namely, when the rear vehicle 2 does not exists or the inter-vehicular distance L12 is longer than the threshold value TH1). On the other hand, FIG. 8B illustrates one example of the synthesized image 111C generated when the rear image angle θB, the rear left image angle θBL and the rear right image angle θBR are set to the large image angle θB_L, the small image angle θBL_S and the small image angle θBR_S, respectively (namely, when the inter-vehicular distance L12 is shorter than the threshold value TH1).

Then, the display 14 displays the synthesized image 111C generated at the step S16 (a step S17).

In the above described description, if it is determined that the inter-vehicular distance L12 is same as the threshold value TH1 as a result of the determination at the step S12, the image synthesizing unit 132 executes the process that is executed when it is determined that the inter-vehicular distance L12 is longer than the threshold value TH1. However, if it is determined that the inter-vehicular distance L12 is same as the threshold value TH1, the image synthesizing unit 132 may execute the process that is executed when it is determined that the inter-vehicular distance L12 is shorter than the threshold value TH1.

(3) Technical Effect

As described above, the image display operation in the present embodiment is capable of generating the synthesized image 111C in which a visibility of the rear vehicle 2 is secured more appropriately when the rear vehicle 2 exists, compared to an image display operation in a comparison example in which the rear image angle θB, the rear left image angle θBL and the rear right image angle θBR are fixed and the proportion of the area of each of the rear image 112B, the rear left image 112BL and the rear right image 112BR to the synthesized image 111C is fixed regardless of the existence/non-existence of the rear vehicle 2 and the inter-vehicular distance L12.

Specifically, when the inter-vehicular distance L12 is longer than the threshold value TH1 (namely, the rear vehicle 2 is relatively distant from the vehicle 1), the rear image angle θB, the rear left image angle θBL and the rear right image angle θBR are set to the normal image angle θB_N, the normal image angle θBL_N and the normal image angle θBR_N, respectively. Thus, the synthesized image 111C illustrated in FIG. 8A is displayed on the display 14.

Figure 9:
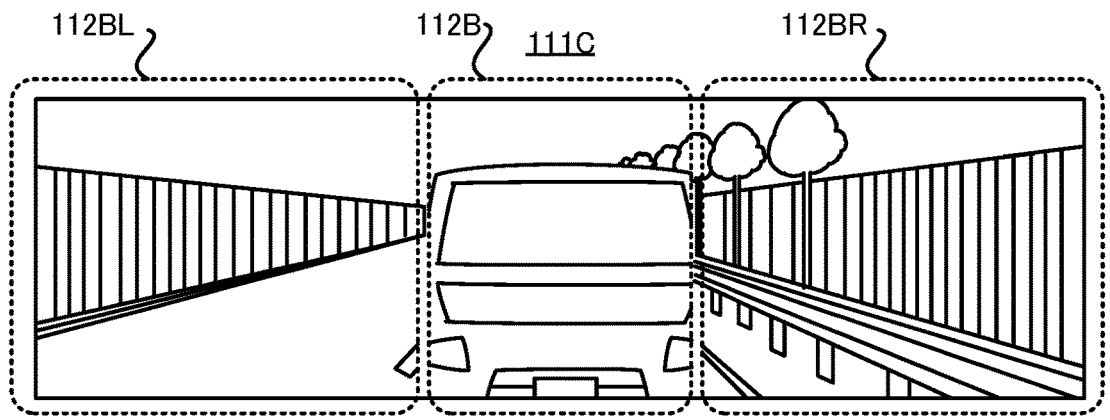
FIG. 9 is a planar view that illustrates one example of the synthesized image in which at least one portion of the rear vehicle is missing.

Then, the rear vehicle 2 becomes larger in the synthesized image 111C as the rear vehicle 2 approaches the vehicle 1 more. Here, if the rear image angle θB, the rear left image angle θBL and the rear right image angle θBR are fixed regardless of the inter-vehicular distance L12, there is a possibility that at least one portion of the rear vehicle 2 is missing in an image part of the synthesized image 111C that corresponds to the rear image 112B as illustrated in FIG. 9 (a right edge part and a left edge part of the rear vehicle 2 are missing in an example illustrated in FIG. 9) at a timing when the rear vehicle 2 approaches the vehicle 1 to some extent (for example, after the inter-vehicular distance L12 is shorter than the threshold value TH1). This is because at least one portion of the rear vehicle 2 in the rear image 111B is excluded from the extracted area of the rear image 112B due to the approach of the rear vehicle 2, which is estimated as one of the reason why at least one portion of the rear vehicle 2 is missing. As a result, there is a possibility the visibility of the rear vehicle 2 in the synthesized image 111C deteriorates.

On the other hand, in the present embodiment, the rear image angle θB, the rear left image angle θBL and the rear right image angle θBR vary on the basis of the inter-vehicular distance L12 and the proportion of the area of each of the rear image 112B, the rear left image 112BL and the rear right image 112BR to the synthesized image 111C varies. Specifically, the rear image angle θB becomes larger at the timing when the rear vehicle 2 approaches the vehicle 1 to some extent, and the rear left image angle θBL and the rear right image angle θBR becomes smaller in response to the increase of the rear image angle θB. Moreover, the proportion of the area of the rear image 112B to the synthesized image 111C increases at the timing when the rear vehicle 2 approaches the vehicle 1 to some extent, and the proportion of the area of each of the rear left image 112BL and the rear right image 112BR to the synthesized image 111C decreases in response to the increase of the proportion of the area of the rear image 112B to the synthesized image 111C. As a result, after the rear vehicle 2 approaches the vehicle 1 to some extent, the display 14 displays the synthesized image 111C that displays the rear image 112B by using a relatively large area due to the increase of the proportion of the area of the rear image 112B to the synthesized image 111C, as illustrated in FIG. 8B.

Thus, the visibility of the rear vehicle 2 in the rear image 112B improves, compared to the case where the display 14 displays the synthesized image 111C that displays the rear image 112B by using a relatively small area. Moreover, after the rear vehicle 2 approaches the vehicle 1 to some extent, the display 14 displays the synthesized image 111C including the rear image 112B in which a scene spreading in a relatively wide field (area or space) is included due to the rear image angle θB being set to the large image angle θB_L, as illustrated in FIG. 8B. Thus, there is smaller or less possibility that at least one portion of the rear vehicle 2 is missing in the rear image 112B. Therefore, when the rear image angle θB varies (moreover, the rear left image angle θBL and the rear right image angle θBR vary in response to the variation of the rear image angle θB) and the proportion of the area of the rear image 112B to the synthesized image 111C varies (moreover, the proportion of the area of each of the rear left image 112BL and the rear right image 112BR to the synthesized image 111C varies in response to the variation of the proportion of the area of the rear image 112B to the synthesized image 111C), the deterioration of the visibility of the rear vehicle 2 in the synthesized image 111C is prevented to some extent. Thus, the image display operation in the present embodiment is capable of generating the synthesized image 111C in which the visibility of the rear vehicle 2 is secured.

(4) Modified Example

Next, modified examples of the image display operation will be described.

(4-1) First Modified Example of Image Display Operation

Figure 10:
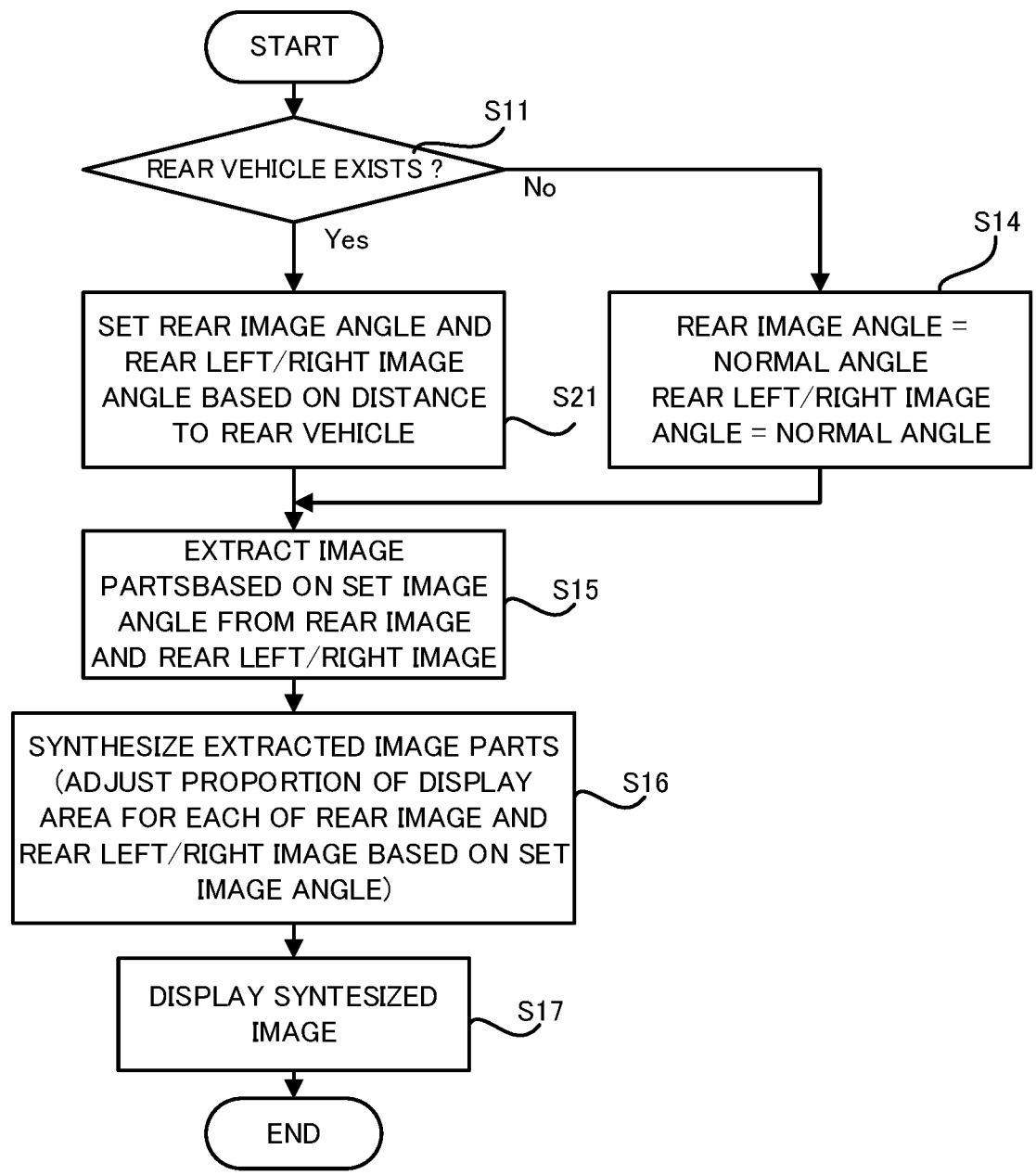
FIG. 10 is a flowchart that illustrates a flow of a first modified example of the image display operation.

With reference to FIG. 10, a first modified example of the image display operation will be described. FIG. 10 is a flowchart that illustrates a flow of the first modified example of the image display operation. Note that the detailed description of a process that is same as the process illustrated in the flowchart of FIG. 4 is omitted by assigning the same step number to this process.

As illustrated in FIG. 10, also in the modified example, the image synthesizing unit 132 determines whether or not the rear vehicle 2 exists (the step S11). If it is determined that the rear vehicle 2 does not exist (the step S11: No), the image synthesizing unit 132 sets the rear image angle θB, the rear left image angle θBL and the rear right image angle θBR to the normal image angle θB_N, the normal image angle θBL_N and the normal image angle θBR_N, respectively (the step S14).

On the other hand, if it is determined that the rear vehicle 2 exists (the step S11: Yes), the image synthesizing unit 132 sets the rear image angle θB, the rear left image angle θBL and the rear right image angle θBR on the basis of the distance from the vehicle 1 to the rear vehicle 2 (namely, the inter-vehicular distance L12) (a step S21).

Figure 11A:
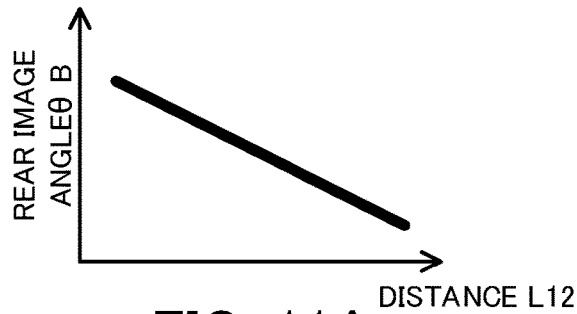
FIG. 11 Each of FIG. 11A to FIG. 11D is a graph that illustrates a relationship between the rear image angle and the distance to the rear vehicle, and each of FIG. 11E to FIG. 11H is a graph that illustrates a relationship between each of a rear left image angle and a rear right image angle and the distance to the rear vehicle.
Figure 11E:
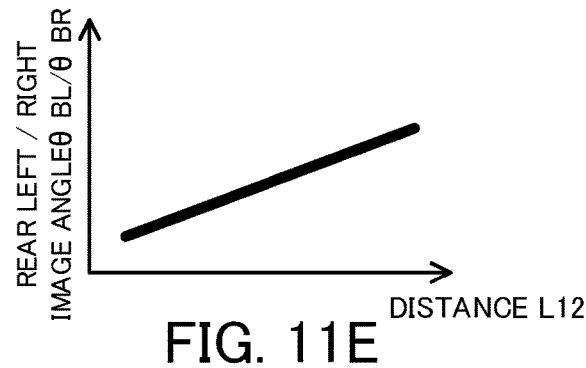
Figure 11B:
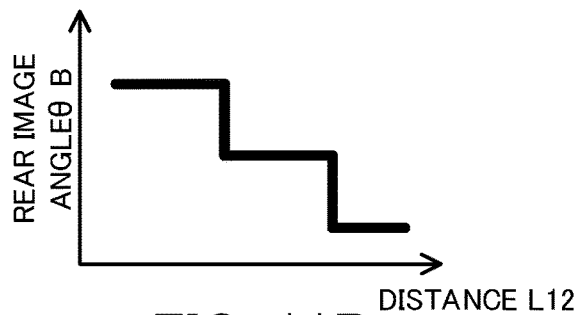
Figure 11F:
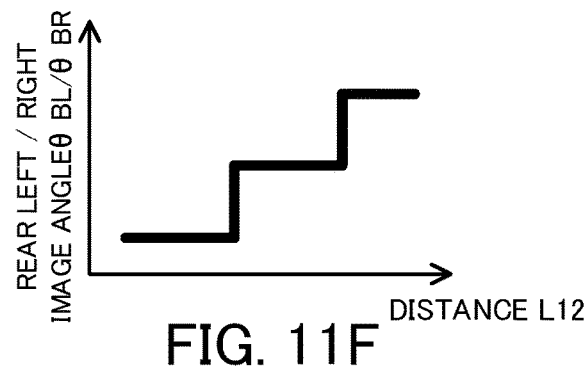
Figure 11C:
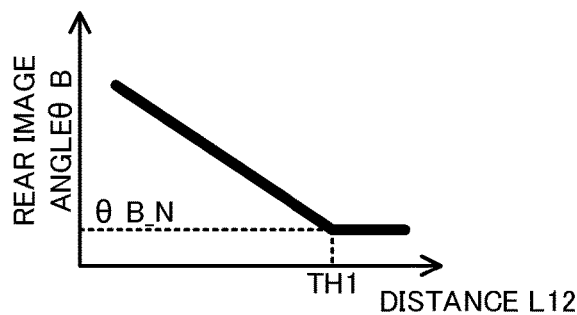
Figure 11G:
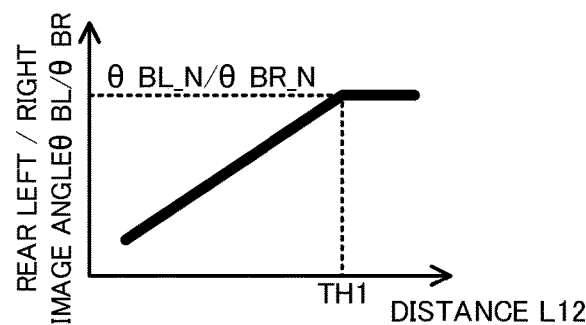
Figure 11D:
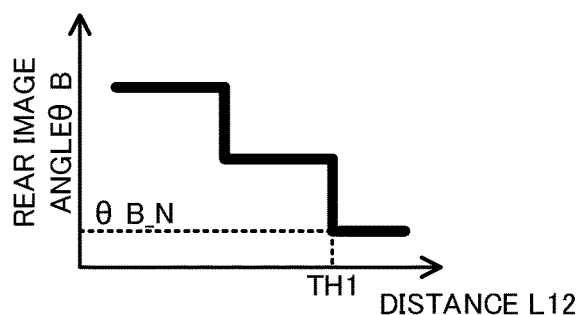

Specifically, the image synthesizing unit 132 sets the rear image angle θB so that the rear image angle θB becomes larger as the inter-vehicular distance L12 becomes shorter. In this case, the image synthesizing unit 132 may set the rear image angle θB so that the rear image angle θB becomes larger sequentially as the inter-vehicular distance L12 becomes shorter, as illustrated in FIG. 11A. Alternatively, the image synthesizing unit 132 may set the rear image angle θB so that the rear image angle θB becomes larger in a stepwise manner as the inter-vehicular distance L12 becomes shorter, as illustrated in FIG. 11B. Moreover, the image synthesizing unit 132 may set the rear image angle θB so that (i) the rear image angle θB becomes larger within a range that is larger than the normal image angle θB_N as the inter-vehicular distance L12 becomes shorter when the inter-vehicular L12 is shorter than the threshold value TH1 and (ii) the rear image angle θB is same as the normal image angle θB_N when the inter-vehicular L12 is longer than the threshold value TH1, as illustrated in FIG. 11C and FIG. 11D.

Figure 11H:
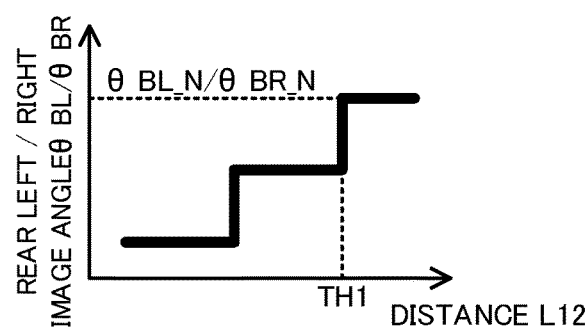

On the other hand, the image synthesizing unit 132 sets the rear left image angle θBL and the rear right image angle θBR so that the rear left image angle θBL and the rear right image angle θBR become smaller as the inter-vehicular distance L12 becomes shorter. In this case, the image synthesizing unit 132 may set the rear left image angle θBL and the rear right image angle θBR so that the rear left image angle θBL and the rear right image angle θBR become smaller sequentially as the inter-vehicular distance L12 becomes shorter, as illustrated in FIG. 11E. Alternatively, the image synthesizing unit 132 may set the rear left image angle θBL and the rear right image angle θBR so that the rear left image angle θBL and the rear right image angle θBR become smaller in a stepwise manner as the inter-vehicular distance L12 becomes shorter, as illustrated in FIG. 11F. Moreover, the image synthesizing unit 132 may set the rear left image angle θBL and the rear right image angle θBR so that (i) the rear left image angle θBL and the rear right image angle θBR become smaller within ranges that are smaller (smaller) than the normal image angle θBL_N and the normal image angle θBR_N, respectively, as the inter-vehicular distance L12 becomes shorter when the inter-vehicular L12 is shorter than the threshold value TH1 and (ii) the rear left image angle θBL and the rear right image angle θBR are same as the normal image angle θBL_N and the normal image angle θBR_N, respectively, when the inter-vehicular L12 is longer than the threshold value TH1, as illustrated in FIG. 11G and FIG. 11H.

Then, the processes from the step S15 to the step S17 are executed also in the modified example.

The above described first modified example of the image display operation is capable of achieving the effect that is same as the effect achieved by the above described image display operation in the present embodiment.

(4-2) Second Modified Example of Image Display Operation

In the above described description, the image synthesizing unit 132 sets the rear image angle θB, the rear left image angle θBL and the rear right image angle θBR on the basis of the inter-vehicular distance L12. On the other hand, in the second modified example, the image synthesizing unit 132 sets the rear image angle θB, the rear left image angle θBL and the rear right image angle θBR on the basis of a velocity V of the vehicle 1 in addition to or instead of the inter-vehicular distance L12.

Specifically, the image synthesizing unit 132 determines whether or not the velocity V is lower than a predetermined threshold value TH2 at the step S12 in FIG. 4. Note that the threshold value TH2 is set to an appropriate value in the same manner as the threshold value TH1. If it is determined that the velocity V is lower than the threshold value TH2, the image synthesizing unit 132 executes the process that should be executed when it is determined that the inter-vehicular distanced L12 is shorter than the threshold value TH1. Namely, the image synthesizing unit 132 sets the rear image angle θB, the rear left image angle θBL and the rear right image angle θBR to the large image angle θB_L, the small image angle θBL_S and the small image angle θBR_S, respectively. On the other hand, if it is determined that the velocity V is higher than the threshold value TH2, the image synthesizing unit 132 executes the process that should be executed when it is determined that the inter-vehicular distanced L12 is longer than the threshold value TH1. Namely, the image synthesizing unit 132 sets the rear image angle θB, the rear left image angle θBL and the rear right image angle θBR to the normal image angle θB_N, the normal image angle θBL_N and the normal image angle θBR_N, respectively.

Alternatively, the image synthesizing unit 132 may set the rear image angle θB, the rear left image angle θBL and the rear right image angle θBR so that the rear image angle θB becomes larger and the rear left image angle θBL and the rear right image angle θBR become smaller as the velocity V becomes lower at the step S21 in FIG. 10.

The above described second modified example of the image display operation is capable of achieving the effect that is same as the effect achieved by the above described image display operation in the present embodiment. The reason is as follows. If the velocity V of the vehicle 1 is relatively low, there is a higher possibility that the rear vehicle 2 approaches the vehicle 1 more, and thus, the inter-vehicular distance L12 becomes shorter relatively easily. Thus, when the velocity V is relatively low, there is a possibility that at least one portion of the rear vehicle 2 is missing in the image part of the synthesized image 111C that corresponds to the rear image 112B, as with the case where the inter-vehicular distance L12 is relatively short. However, in the second modified example, the rear image angle θB, the rear left image angle θBL and the rear right image angle θBR vary on the basis of the velocity V. As a result, after the rear vehicle 2 approaches the vehicle 1 to some extent, the display 14 displays the synthesized image 111C that displays the rear image 112B including the scene spreading in the relatively wide field (area or space) by using the relatively large area. Thus, the second modified example of the image display operation is also capable of generating the synthesized image 111C in which the visibility of the rear vehicle 2 is secured.

(4-3) Another Modified Example

In the above described description, the image synthesizing unit 132 extracts the rear image 112B corresponding to the rear image angle θB, the rear left image 112BL corresponding to the rear left image angle θBL and the rear right image 112BR corresponding to the rear right image angle θBR from the rear image 111B, the rear left image 111BL and the rear right image 111BR, respectively. Namely, the image synthesizing unit 132 generates the synthesized image 111C corresponding to the rear image angle θB, the rear left image angle θBL and the rear right image angle θBR by executing an image process (an image processing) based on the rear image angle θB, the rear left image angle θBL and the rear right image angle θBR on the rear image 111B, the rear left image 111BL and the rear right image 111BR. However, the image synthesizing unit 132 may generate the synthesized image 111C corresponding to the rear image angle θB, the rear left image angle θBL and the rear right image angle θBR by using another method. One example of another method of generating the synthesized image 111C corresponding to the rear image angle θB, the rear left image angle θBL and the rear right image angle θBR will be described.

Figure 12:
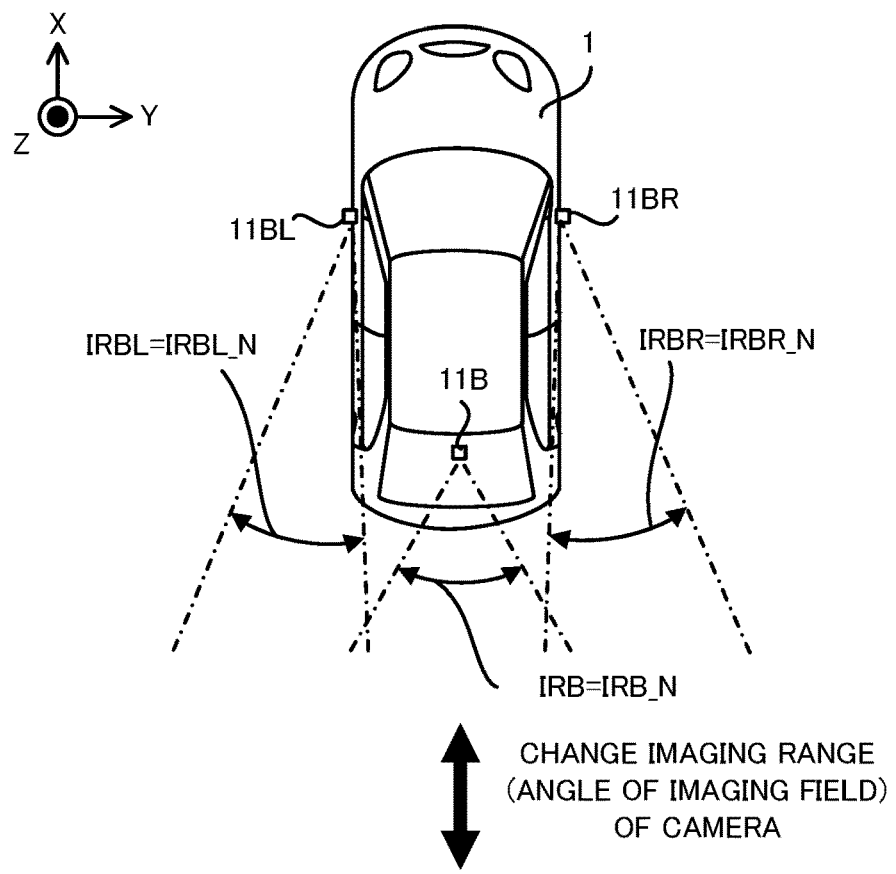
FIG. 12 is a planar view that illustrates the adjusted imaging range of each of the rear camera, the rear left camera and the rear right camera when the rear vehicle does not exist or the distance to the rear vehicle is longer than a threshold value, and illustrates the adjusted imaging range of each of the rear camera, the rear left camera and the rear right camera when the distance to the rear vehicle is shorter than the threshold value.
Figure 12:
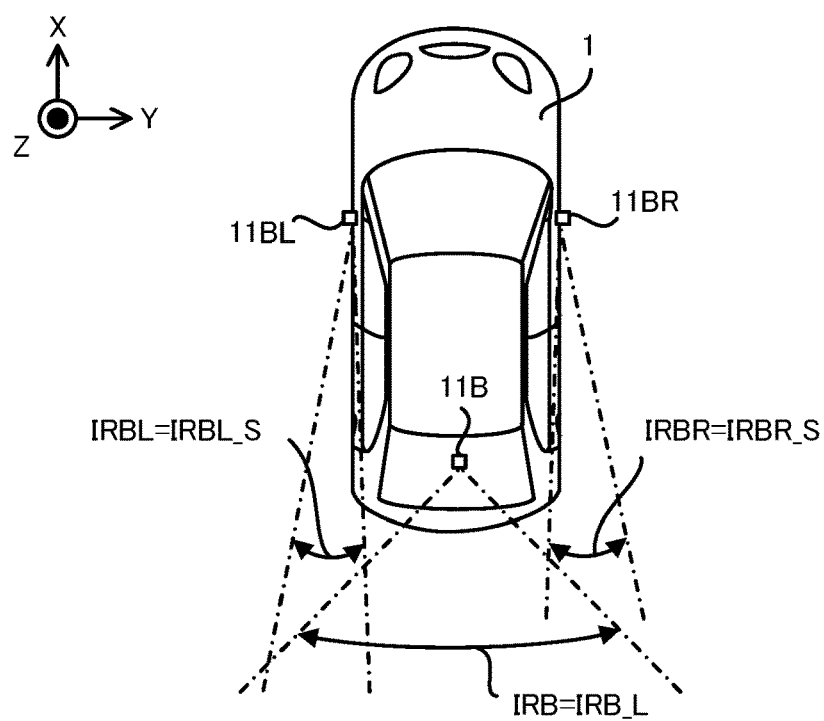

The image synthesizing unit 132 may generate the synthesized image 111C corresponding to the rear image angle θB, the rear left image angle θBL and the rear right image angle θBR by controlling the rear camera 11B, the rear left camera 11BL and the rear right camera 11BR. For example, the image synthesizing unit 132 may generate the synthesized image 111C corresponding to the rear image angle θB, the rear left image angle θBL and the rear right image angle θBR by controlling an optical parameter of each of the rear camera 11B, the rear left camera 11BL and the rear right camera 11BR so that the imaging range IRB, the imaging range IRBL and the imaging range IRBR vary. A focal length of an optical system (for example, a lens or the like) of each of the rear camera 11B, the rear left camera 11BL and the rear right camera 11BR is one example of the optical parameter. In this case, the image synthesizing unit 132 may control the rear camera 11B, the rear left camera 11BL and the rear right camera 11BR so that the imaging range IRB of the rear camera 11B is same as an imaging range IRB_N corresponding to the normal image angle θB_N, the imaging range IRBL of the rear left camera 11BL is same as an imaging range IRBL_N corresponding to the normal image angle θBL_N and the imaging range IRBR of the rear right camera 11BR is same as an imaging range IRBR_N corresponding to the normal image angle θBR_N when the rear vehicle 2 does not exist or the inter-vehicular distance L12 is longer than the threshold value TH1, as illustrated in an upper part of FIG. 12. On the other hand, the image synthesizing unit 132 may control the rear camera 11B, the rear left camera 11BL and the rear right camera 11BR so that the imaging range IRB of the rear camera 11B is same as an imaging range IRB_L corresponding to the large image angle θB_L (namely, the imaging range IRB_L that is larger than the imaging range IRB_N), the imaging range IRBL of the rear left camera 11BL is same as an imaging range IRBL_S corresponding to the small image angle θBL_S (namely, the imaging range IRBL_S that is smaller than the imaging range IRBL_N) and the imaging range IRBR of the rear right camera 11BR is same as an imaging range IRBR_S corresponding to the small image angle θBR_S (namely, the imaging range IRBR_S that is smaller than the imaging range IRBR_N) when the inter-vehicular distance L12 is shorter than the threshold value TH1, as illustrated in a lower part of FIG. 12. In this case, the image synthesizing unit 132 may use the rear image 111B, the rear left image 111BL and the rear right image 111BR directly as the rear image 112B, the rear left image 112BL and the rear right image 112BR.

Figure 13:
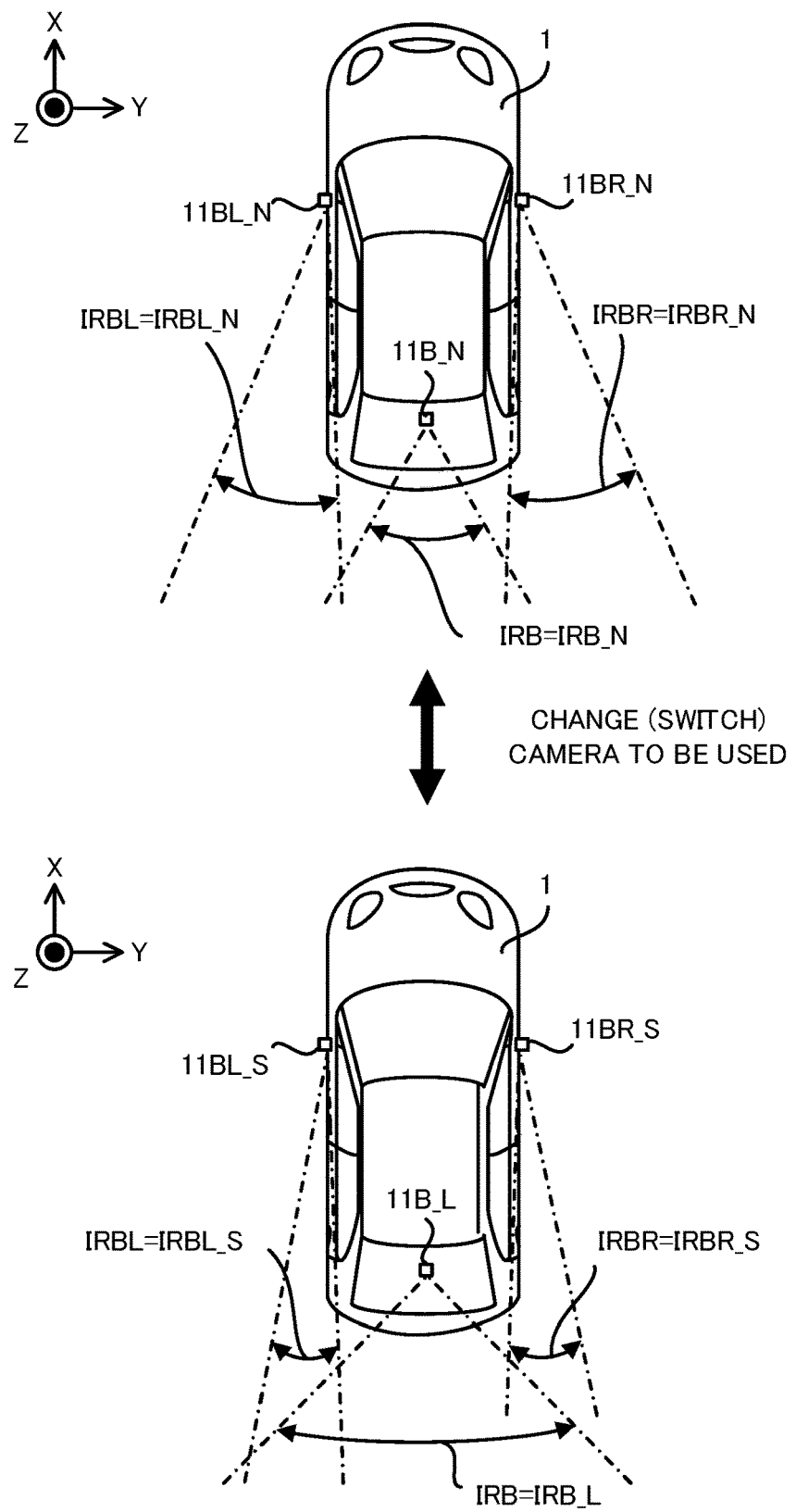
FIG. 13 is a planar view that illustrates the imaging range of each of the rear camera, the rear left camera and the rear right camera selected when the rear vehicle does not exist or the distance to the rear vehicle is longer than a threshold value, and illustrates the imaging range of each of the rear camera, the rear left camera and the rear right camera selected when the distance to the rear vehicle is shorter than the threshold value.

Alternatively, when the vehicle 1 is provided with a plurality of rear cameras 11B having different imaging ranges IRB, the imaging synthesizing unit 132 may generate the synthesized image 111C corresponding to the rear image angle θB by selecting one rear camera 11B that is used to actually capture the rear image 111B from the plurality of rear cameras 11B on the basis of the existence/non-existence of the rear vehicle 2 and the inter-vehicular distance L12. Specifically, the vehicle 1 may be provided with a rear camera 11B_N and a rear camera 11B_L. The imaging range IRB of the rear camera 11B_N is the imaging range IRB_N corresponding to the normal image angle θB_N. The imaging range IRB of the rear camera 11B_L is the imaging range IRB_L corresponding to the large image angle θB_L. In this case, the image synthesizing unit 132 may control the rear camera 11B_N so that the rear camera 11B_N captures the rear image 111B when the rear vehicle 2 does not exist or the inter-vehicular distance L12 is longer than the threshold value TH1, as illustrated in an upper part of FIG. 13. On the other hand, the image synthesizing unit 132 may control the rear camera 11B_L so that the rear camera 11B_L captures the rear image 111B when the inter-vehicular distance L12 is shorter than the threshold value TH1, as illustrated in a lower part of FIG. 13. Similarly, the vehicle 1 may be provided with a rear left camera 11BL_N and a rear left camera 11BL_S. The imaging range IRBL of the rear left camera 11BL_N is the imaging range IRBL_N corresponding to the normal image angle θBL_N. The imaging range IRBL of the rear left camera 11BL_S is the imaging range IRBL_S corresponding to the small image angle θBL_S. In this case, the image synthesizing unit 132 may generate the synthesized image 111C corresponding the rear left image angle θBL by controlling the rear left camera 11BL_N and the rear left camera 11BL_S so that the rear left camera 11BL_N captures the rear left image 111BL when the rear vehicle 2 does not exist or the inter-vehicular distance L12 is longer than the threshold value TH1 as illustrated in the upper part of FIG. 13 and the rear left camera 11BL_S captures the rear left image 111BL when the inter-vehicular distance L12 is shorter than the threshold value TH1 as illustrated in the lower part of FIG. 13. Similarly, the vehicle 1 may be provided with a rear right camera 11BR_N and a rear right camera 11BR_S. The imaging range IRBR of the rear right camera 11BR_N is the imaging range IRBR_N corresponding to the normal image angle θBR_N. The imaging range IRBR of the rear right camera 11BR_S is the imaging range IRBR_S corresponding to the small image angle θBR_S. In this case, the image synthesizing unit 132 may generate the synthesized image 111C corresponding the rear right image angle θBR by controlling the rear right camera 11BR_N and the rear right camera 11BR_S so that the rear right camera 11BR_N captures the rear right image 111BR when the rear vehicle 2 does not exist or the inter-vehicular distance L12 is longer than the threshold value TH1 as illustrated in the upper part of FIG. 13 and the rear right camera 11BR_S captures the rear right image 111BR when the inter-vehicular distance L12 is shorter than the threshold value TH1 as illustrated in the lower part of FIG. 13. In this case, the image synthesizing unit 132 may use the rear image 111B, the rear left image 111BL and the rear right image 111BR directly as the rear image 112B, the rear left image 112BL and the rear right image 112BR.

Figure 14A:
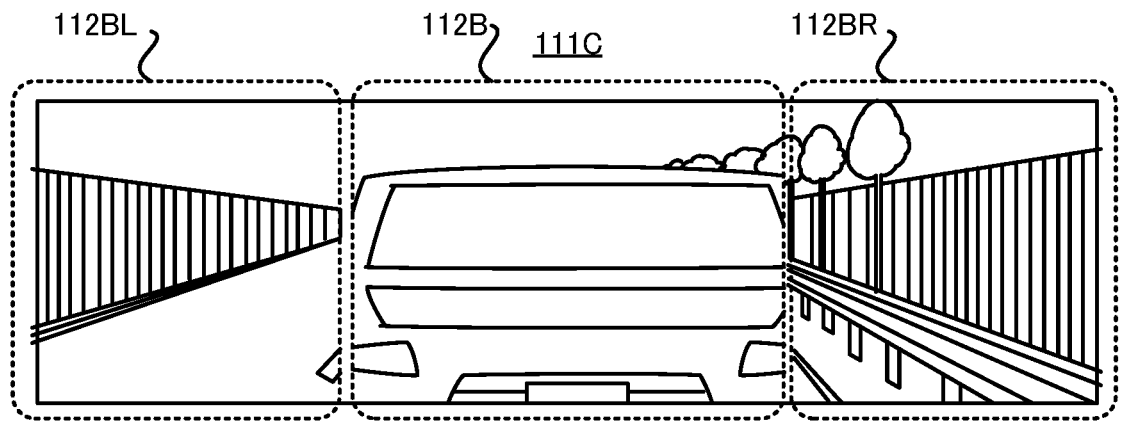
FIG. 14 Each of FIG. 14A to 14C is a planar view that illustrates one example of the synthesized image.
Figure 14B:
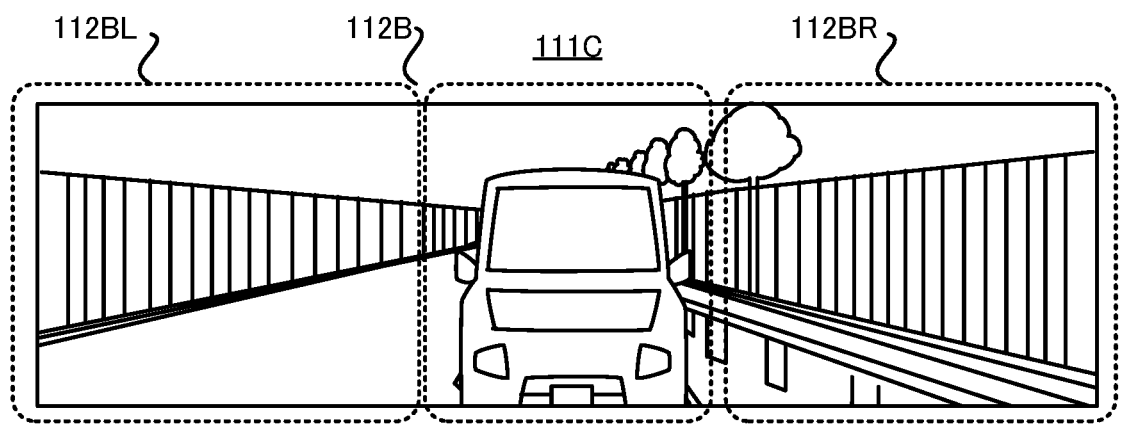
Figure 14C:
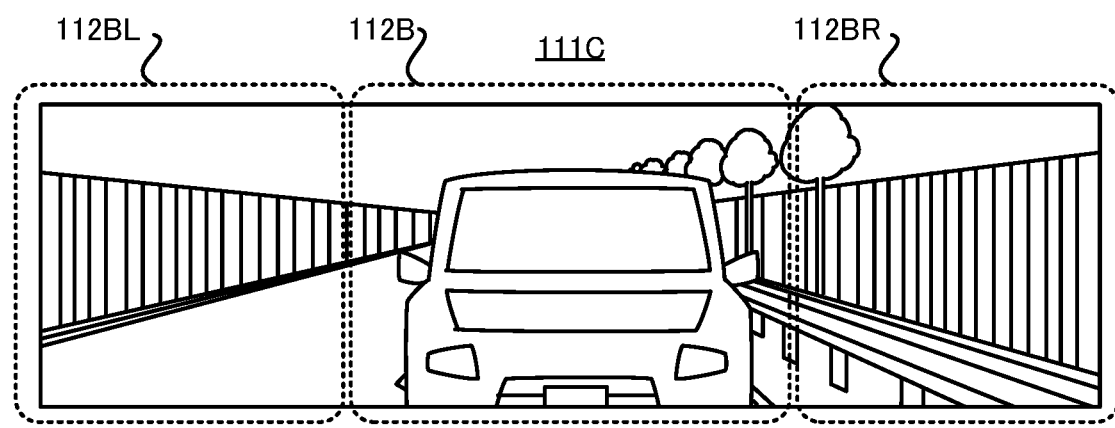

In the above described description, the image synthesizing unit 132 varies the rear image angle θB, the rear left image angle θBL and the rear right image angle θBR on the basis of the existence/non-existence of the rear vehicle 2 and the inter-vehicular distance L12 and also varies the proportion of the area of each of the rear image 112B, the rear left image 112BL and the rear right image 112BR to the synthesized image 111C in response to the variation of the rear image angle θB, the rear left image angle θBL and the rear right image angle θBR. However, the image synthesizing unit 132 may vary the proportion of the area of each of the rear image 112B, the rear left image 112BL and the rear right image 112BR to the synthesized image 111C on the basis of the existence/non-existence of the rear vehicle 2 and the inter-vehicular distance L12 without varying the rear image angle θB, the rear left image angle θBL and the rear right image angle θBR. In this case, as illustrated in FIG. 14A, the image synthesizing unit 132 may expand (in other words, scale up) the rear image 111B in the horizontal direction and minify (in other words, scale down) the rear left image 111BL and the rear right image 111BR in the horizontal direction, and then generate the synthesized image 111C by using the expanded rear image 111B, the minified rear left image 111BL and the minified rear right image 111BR. Alternatively, the image synthesizing unit 132 may vary the rear image angle θB, the rear left image angle θBL and the rear right image angle θBR on the basis of the existence/non-existence of the rear vehicle 2 and the inter-vehicular distance L12 without varying the proportion of the area of each of the rear image 112B, the rear left image 112BL and the rear right image 112BR to the synthesized image 111C. In this case, as illustrated in FIG. 14B, the image synthesizing unit 132 may minify (in other words, scale down) the rear image 111B in the horizontal direction and expand (in other words, scale up) the rear left image 111BL and the rear right image 111BR in the horizontal direction, and then generate the synthesized image 111C by using the minified rear image 111B, the expanded rear left image 111BL and the expanded rear right image 111BR. Even in these cases, the variation of the rear image angle θB, the rear left image angle θBL and the rear right image angle θBR or the variation of the proportion of the area of each of the rear image 112B, the rear left image 112BL and the rear right image 112BR to the synthesized image 111C allows the display 14 to display the synthesized image 111C that includes the rear image 112B in which the scene spreading in the relatively wide field is included or the synthesized image 111C that displays the rear image 112B by using the relatively large displaying area. Thus, the fact remains that the deterioration of the visibility of the rear vehicle 2 in the synthesized image 111C is prevented to some extent. Therefore, an effect that is same as the above described effect can be achieved. Note that FIG. 14C illustrates the synthesized image 111C when the rear image angle θB, the rear left image angle θBL, the rear right image angle θBR and the proportion of the area of each of the rear image 112B, the rear left image 112BL and the rear right image 112BR to the synthesized image 111C vary.

(5) Additional Statement

Relating to the above described embodiment, following additional statements will be disclosed.

(5-1) Additional Statement 1

An image display apparatus according to the additional statement 1 is provided with: a synthesizing device that is configured to synthesize a rear image and a rear side image to generate a synthesized image, wherein the rear image is captured by a rear imaging device that is configured to image a rear area located at the rear of a first vehicle and the rear side image is captured by a rear side imaging device that is configured to image a rear side area located at the rear and the side of the first vehicle; and a displaying device that is configured to display the synthesized image, the synthesizing device is configured to vary a proportion of each of a rear image area and a rear side image area to the synthesized image on the basis of at least one of a velocity of the first vehicle and a distance between the first vehicle and a second vehicle that exists at the rear of the first vehicle, wherein the rear image area is an area in which the rear image is displayed in the synthesized image and the rear side image area is an area in which the rear side image is displayed in the synthesized image, when the synthesizing device generates the synthesized image.

Alternatively, an image display apparatus according to the additional statement 1 may be provided with: a controller that is programmed to synthesize a rear image and a rear side image to generate a synthesized image, wherein the rear image is captured by a rear imager that is configured to image a rear area located at the rear of a first vehicle and the rear side image is captured by a rear side imager that is configured to image a rear side area located at the rear and the side of the first vehicle; and a display that is configured to display the synthesized image, the controller is programmed to vary a proportion of each of a rear image area and a rear side image area to the synthesized image on the basis of at least one of a velocity of the first vehicle and a distance between the first vehicle and a second vehicle that exists at the rear of the first vehicle, wherein the rear image area is an area in which the rear image is displayed in the synthesized image and the rear side image area is an area in which the rear side image is displayed in the synthesized image, when the controller generates the synthesized image.

The image display apparatus according to the additional statement 1 is capable of synthesizing the rear image and the rear side image while securing the visibility of the second vehicle in the synthesized image when the second vehicle exists at the rear of the first vehicle, compared to an image display apparatus in a comparison example in which the proportion of each of the rear image area and the rear side image area to the synthesized image is fixed regardless of the velocity of the first vehicle and the distance between the first vehicle and the second vehicle.

(5-2) Additional Statement 2

An image display apparatus according to the additional statement 2 is the image display apparatus according to the additional statement 1, wherein the synthesizing device is configured to (alternatively, the controller is programmed to) vary the proportion of the rear image area to the synthesized image so that the proportion of the rear image area to the synthesized image becomes larger as the distance becomes shorter.

If the distance between the first vehicle and the second vehicle is relatively short, there is a possibility that the image part of the synthesized image corresponding to the rear image includes the second vehicle in a state where the visibility of the second vehicle deteriorates. As a result, there is a possibility that the visibility of the second vehicle deteriorates in the synthesized image. In the image display apparatus according to the additional statement 2, the proportion of the rear image area to the synthesized image becomes larger as the distance between the first vehicle and the second vehicle becomes shorter. Namely, the rear image is displayed at a relatively large displaying area in the synthesized image. When the rear image is displayed at the relatively large displaying area, the visibility of the rear image improves. Therefore, the deterioration of the visibility of the second vehicle (especially, the second vehicle in the rear image) in the synthesized image is prevented to some extent. Namely, the image display apparatus according to the additional statement 2 is capable of synthesizing the rear image and the rear side image while securing the visibility of the second vehicle in the synthesized image.

Note that the synthesizing device may be configured to (alternatively, controller may be programmed to) vary the proportion of the rear side image area to the synthesized image so that the proportion of the rear side image area to the synthesized image becomes smaller as the distance becomes shorter.

(5-3) Additional Statement 3

An image display apparatus according to the additional statement 3 is the image display apparatus according to the additional statement 1 or 2, wherein the synthesizing device is configured to (alternatively, the controller is programmed to) vary the proportion of the rear image area to the synthesized image so that the proportion of the rear image area to the synthesized image when the distance is shorter than a predetermined first threshold value is larger than the proportion of the rear image area to the synthesized image when the distance is longer than the first threshold value.

The image display apparatus according to the additional statement 3 is capable of synthesizing the rear image and the rear side image while securing the visibility of the second vehicle in the synthesized image, as with the image display apparatus according to the additional statement 2.

Note that the synthesizing device may be configured to (alternatively, the controller may be programmed to) vary the proportion of the rear side image area to the synthesized image so that the proportion of the rear side image area to the synthesized image when the distance is shorter than the first threshold value is smaller than the proportion of the rear side image area to the synthesized image when the distance is longer than the first threshold value.

(5-4) Additional Statement 4

An image display apparatus according to the additional statement 4 is the image display apparatus according to any one of the additional statements 1 to 3, wherein the synthesizing device is configured to (alternatively, the controller is programmed to) vary the proportion of the rear image area to the synthesized image so that the proportion of the rear image area to the synthesized image becomes larger as the velocity becomes lower.

If the velocity of the first vehicle is relatively low, there is a higher possibility that the second vehicle approaches the first vehicle more, and thus, the distance between the first vehicle and the second vehicle becomes shorter relatively easily. Thus, when the velocity of the first vehicle is relatively low, there is a possibility that the image part of the synthesized image corresponding to the rear image includes the second vehicle in a state where the visibility of the second vehicle deteriorates, as with the case where the distance between the first vehicle and the second vehicle is relatively short. In the image display apparatus according to the additional statement 4, the proportion of the rear image area to the synthesized image becomes larger as the velocity of the first vehicle becomes shorter. Thus, the image display apparatus according to the additional statement 4 is capable of synthesizing the rear image and the rear side image while securing the visibility of the second vehicle in the synthesized image, as with the image display apparatus according to the additional statement 2.

Note that the synthesizing device may be configured to (alternatively, the controller may be programmed to) vary the proportion of the rear side image area to the synthesized image so that the proportion of the rear side image area to the synthesized image becomes smaller as the velocity becomes lower.

(5-5) Additional Statement 5

An image display apparatus according to the additional statement 5 is the image display apparatus according to any one of the additional statements 1 to 4, wherein the synthesizing device is configured to (alternatively, the controller is programmed to) vary the proportion of the rear image area to the synthesized image so that the proportion of the rear image area to the synthesized image when the velocity is lower than a predetermined second threshold value is larger than the proportion of the rear image area to the synthesized image when the velocity is higher than the second threshold value.

The image display apparatus according to the additional statement 5 is capable of synthesizing the rear image and the rear side image while securing the visibility of the second vehicle in the synthesized image, as with the image display apparatus according to the additional statement 4.

Note that the synthesizing device may be configured to (alternatively, the controller may be programmed to) vary the proportion of the rear side image area to the synthesized image so that the proportion of the rear side image area to the synthesized image when the velocity is lower than the second threshold value is smaller than the proportion of the rear side image area to the synthesized image when the velocity is higher than the second threshold value.

(5-6) Additional Statement 6

An image display apparatus according to the additional statement 6 is the image display apparatus according to any one of the additional statements 1 to 5, wherein the synthesizing device is configured to (alternatively, the controller is programmed to) vary an image angle of each of a first image part and a second image part on the basis of at least one of the velocity and the distance, wherein the first image part is an image part that is one portion of the synthesized image and that corresponds to the rear image and the second image part is an image part that is one portion of the synthesized image and that corresponds to the rear side image, when the synthesizing device (alternatively, the controller) generates the synthesized image.

The image display apparatus according to the additional statement 6 is capable of synthesizing the rear image and the rear side image while securing the visibility of the second vehicle in the synthesized image when the second vehicle exists at the rear of the first vehicle, compared to an image display apparatus in a comparison example in which the image angle of each of the first image part and the second image part is fixed regardless of the velocity of the first vehicle and the distance between the first vehicle and the second vehicle.

Note that the "image angle of a certain image part" means an index value that represents, as an angle from a virtual viewpoint, a range of a scene included the certain image part displayed by the displaying device or the display.

(5-7) Additional Statement 7

An image display apparatus according to the additional statement 7 is provided with: a synthesizing device that is configured to synthesize a rear image and a rear side image to generate a synthesized image, wherein the rear image is captured by a rear imaging device that is configured to image a rear area located at the rear of a first vehicle and the rear side image is captured by a rear side imaging device that is configured to image a rear side area located at the rear and the side of the first vehicle; and a displaying device that is configured to display the synthesized image, the synthesizing device is configured to vary an image angle of each of a first image part and a second image part on the basis of at least one of a velocity of the first vehicle and a distance between the first vehicle and a second vehicle that exists at the rear of the first vehicle, wherein the first image part is an image part that is one portion of the synthesized image and that corresponds to the rear image and the second image part is an image part that is one portion of the synthesized image and that corresponds to the rear side image, when the synthesizing device generates the synthesized image.

Alternatively, an image display apparatus according to the additional statement 7 may be provided with: a controller that is programmed to synthesize a rear image and a rear side image to generate a synthesized image, wherein the rear image is captured by a rear imager that is configured to image a rear area located at the rear of a first vehicle and the rear side image is captured by a rear side imager that is configured to image a rear side area located at the rear and the side of the first vehicle; and a display that is configured to display the synthesized image, the controller is programmed to vary an image angle of each of a first image part and a second image part on the basis of at least one of a velocity of the first vehicle and a distance between the first vehicle and a second vehicle that exists at the rear of the first vehicle, wherein the first image part is an image part that is one portion of the synthesized image and that corresponds to the rear image and the second image part is an image part that is one portion of the synthesized image and that corresponds to the rear side image, when the controller generates the synthesized image.

The image display apparatus according to the additional statement 7 is capable of synthesizing the rear image and the rear side image while securing the visibility of the second vehicle in the synthesized image when the second vehicle exists at the rear of the first vehicle, compared to an image display apparatus in a comparison example in which the image angle of each of the first image part and the second image part is fixed regardless of the velocity of the first vehicle and the distance between the first vehicle and the second vehicle.

(5-8) Additional Statement 8

An image display apparatus according to the additional statement 8 is the image display apparatus according to the additional statement 6 or 7, wherein the synthesizing device is configured to (alternatively, the controller is programmed to) vary the image angle of the first image part so that the image angle of the first image part becomes larger as the distance becomes shorter.

As described above, if the distance between the first vehicle and the second vehicle is relatively short, there is a possibility that the visibility of the second vehicle deteriorates in the synthesized image. In the image display apparatus according to the additional statement 8, the image angle of the rear image becomes larger as the distance between the first vehicle and the second vehicle becomes shorter. If the image angle of the rear image becomes larger, the rear image includes the scene spreading in the wider or larger field (namely, a blind area that is not included in the rear image becomes smaller). Thus, the visibility of the rear image improves. Therefore, the deterioration of the visibility of the second vehicle (especially, the second vehicle in the rear image) in the synthesized image is prevented to some extent. Namely, the image display apparatus according to the additional statement 8 is capable of synthesizing the rear image and the rear side image while securing the visibility of the second vehicle in the synthesized image.

Note that the synthesizing device may be configured to (alternatively, the controller may be programmed to) vary the image angle of the second image part so that the image angle of the second image part becomes smaller as the distance becomes shorter.

(5-9) Additional Statement 9

An image display apparatus according to the additional statement 9 is the image display apparatus according to any one of the additional statements 6 to 8, wherein the synthesizing device is configured to (alternatively, the controller is programmed to) vary the image angle of the first image part so that the image angle of the first image part when the distance is shorter than a predetermined first threshold value is larger than the image angle of the first image part when the distance is longer than the first threshold value.

The image display apparatus according to the additional statement 9 is capable of synthesizing the rear image and the rear side image while securing the visibility of the second vehicle in the synthesized image, as with the image display apparatus according to the additional statement 8.

Note that the synthesizing device may be configured to (alternatively, the controller may be programmed to) vary the image angle of the second image part so that the image angle of the second image part when the distance is shorter than the first threshold value is smaller than the image angle of the second image part when the distance is longer than the first threshold value.

(5-10) Additional Statement 10

An image display apparatus according to the additional statement 10 is the image display apparatus according to any one of the additional statements 6 to 9, wherein the synthesizing device is configured to (alternatively, the controller is programmed to) vary the image angle of the first image part so that the image angle of the first image part becomes larger as the velocity becomes lower.

As described above, if the velocity of the first vehicle is relatively low, there is a possibility that the visibility of the second vehicle deteriorates in the synthesized image. In the image display apparatus according to the additional statement 10, the image angle of the rear image becomes larger as the velocity of the first vehicle becomes lower. Thus, the image display apparatus according to the additional statement 10 is capable of synthesizing the rear image and the rear side image while securing the visibility of the second vehicle in the synthesized image, as with the image display apparatus according to the additional statement 8.

Note that the synthesizing device may be configured to (alternatively, the controller may be programmed to) vary the image angle of the second image part so that the image angle of the second image part becomes smaller as the velocity becomes lower.

(5-11) Additional Statement 11

An image display apparatus according to the additional statement 11 is the image display apparatus according to any one of the additional statements 6 to 10, wherein the synthesizing device is configured to (alternatively, the controller is programmed to) vary the image angle of the first image part so that the image angle of the first image part when the velocity is lower than a predetermined second threshold value is larger than the image angle of the first image part when the velocity is higher than the second threshold value.

The image display apparatus according to the additional statement 11 is capable of synthesizing the rear image and the rear side image while securing the visibility of the second vehicle in the synthesized image, as with the image display apparatus according to the additional statement 10.

Note that the synthesizing device may be configured to (alternatively, the controller may be programmed to) vary the image angle of the second image part so that the image angle of the second image part when the velocity is lower than the second threshold value is smaller than the image angle of the second image part when the velocity is higher than the second threshold value.

(5-12) Additional Statement 12

An image display apparatus according to the additional statement 12 is the image display apparatus according to any one of the additional statements 7 to 11, wherein the synthesizing device is configured to (alternatively, the controller may be programmed to) vary the image angle of each of the first image part and the second image part without varying a proportion of each of a rear image area and a rear side image area to the synthesized image, wherein the rear image area is an area in which the rear image is displayed in the synthesized image and the rear side image area is an area in which the rear side image is displayed in the synthesized image.

(5-13) Additional Statement 13

An image display apparatus according to the additional statement 13 is the image display apparatus according to any one of the additional statements 6 to 12, wherein the synthesizing device is configured to (alternatively, the controller is programmed to) extract a rear image part that is at least one portion of the rear image and a rear side image part that is at least one portion of the rear side image and to generate the synthesized image by synthesizing the rear image part and the rear side image part, the synthesizing device is configured to (alternatively, the controller is programmed to) vary the image angle of each of the first image part and the second image part by varying an area in the rear image from which the rear image part is extracted and an area in the rear side image from which the rear side image part is extracted on the basis of at least one of the distance and the velocity.

(5-14) Additional Statement 14

An image display apparatus according to the additional statement 14 is the image display apparatus according to any one of the additional statements 6 to 13, wherein the synthesizing device is configured to vary the image angle of the first image part and the second image part by controlling the rear imaging device and the rear side imaging device on the basis of at least one of the velocity and the distance so that an imaging range of each of the rear imaging device and the rear side imaging device varies.

Alternatively, an image display apparatus according to the additional statement 14 may be the image display apparatus according to any one of the additional statements 6 to 13, wherein the controller is programmed to vary the image angle of the first image part and the second image part by controlling the rear imager and the rear side imager on the basis of at least one of the velocity and the distance so that an imaging range of each of the rear imager and the rear side imager varies.

(5-15) Additional Statement 15

An image display apparatus according to the additional statement 15 is the image display apparatus according to any one of the additional statements 6 to 14, wherein the vehicle is provided with a plurality of rear imaging devices having different imaging ranges, respectively, the synthesizing device is configured to vary the image angle of the first image part by selecting, as one rear imaging device that should capture the rear image used for generating the synthesized image, one of the plurality of rear imaging devices on the basis of at least one of the velocity and the distance.

Alternatively, an image display apparatus according to the additional statement 15 may be the image display apparatus according to any one of the additional statements 6 to 14, wherein the vehicle is provided with a plurality of rear imagers having different imaging ranges, respectively, the controller is programmed to vary the image angle of the first image part by selecting, as one rear imager that should capture the rear image used for generating the synthesized image, one of the plurality of rear imagers on the basis of at least one of the velocity and the distance.

(5-16) Additional Statement 16

An image display apparatus according to the additional statement 16 is the image display apparatus according to any one of the additional statements 6 to 15, wherein the vehicle is provided with a plurality of rear side imaging devices having different imaging ranges, respectively, the synthesizing device is configured to vary the image angle of the second image part by selecting, as one rear side imaging device that should capture the rear side image used for generating the synthesized image, one of the plurality of rear side imaging devices on the basis of at least one of the velocity and the distance.

Alternatively, an image display apparatus according to the additional statement 16 may be the image display apparatus according to any one of the additional statements 6 to 15, wherein the vehicle is provided with a plurality of rear side imagers having different imaging ranges, respectively, the controller is programmed to vary the image angle of the second image part by selecting, as one rear side imager that should capture the rear side image used for generating the synthesized image, one of the plurality of rear side imagers on the basis of at least one of the velocity and the distance.

At least one portion of the feature in the above described embodiment and the modified example may be eliminated or modified accordingly. At least one feature in the above described embodiment and the modified example may be combined with another one feature in the above described embodiment and the modified example.

This application is based upon and claims the benefit of priority of the prior Japanese Patent Application No. 2017-243705, filed on Dec. 20, 2017, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST 1, 2 vehicle
11B, 11B_N, 11B_L rear camera
11BL, 11BL_N, 11BL_S rear left camera
11BR, 11BR_N, 11BR_S rear right camera
12 rear vehicle sensor
13 ECU
131 image collecting unit
132 image synthesizing unit
14 display
111B, 112B rear image
111BL, 112BL rear left image
111BR, 112BR rear right image
111C synthesized image
IRB, IRBL, IRBR imaging range
θB, θBh, θBv rear image angle
θBL rear left image angle
θBR rear right image angle
θB_N, θBL_N, θBR_N normal image angle
θB_L large image angle
θBL_S, θBR_S small image angle

The invention claimed is:

1. An image display apparatus comprising:
a controller that is programmed to synthesize a rear image and a rear side image to generate a synthesized image, wherein the rear image is captured by a rear imager that is configured to image a rear area located at the rear of a first vehicle and the rear side image is captured by a rear side imager that is configured to image a rear side area located at the rear and the side of the first vehicle; and
a display that is configured to display the synthesized image,
the controller being programmed to vary each of a first area of the synthesized image occupied by the rear image and a second area of the synthesized image occupied by the rear side image on the basis of a distance between the first vehicle and a second vehicle that exists at the rear of the first vehicle, when the controller generates the synthesized image, and
the controller being further programmed to vary the first area so that a horizontal size of the first area becomes larger as a velocity of the first vehicle becomes lower.

2. The image display apparatus according to claim 1, wherein
the controller is programmed to vary the first area so that the horizontal size of the first area becomes larger as the distance becomes shorter.

3. The image display apparatus according to claim 1, wherein
the controller is programmed to vary the first area so that the horizontal size of the first area when the distance is shorter than a predetermined first threshold value is larger than the horizontal size of the first area when the distance is longer than the first threshold value.

4. The image display apparatus according to claim 1, wherein
the controller is programmed to vary the first area so that the horizontal size of the first area when the velocity of the first vehicle is lower than a predetermined second threshold value is larger than the horizontal size of the first area when the velocity is higher than the second threshold value.

5. The image display apparatus according to claim 1, wherein
the controller is programmed to:
synthesize a first image part, which is at least a part of the rear image, and a second image part, which is at least a part of the rear side image, to generate the synthesized image; and
vary each of a range corresponding to the first image part in the rear image and a range corresponding to the second image part in the rear side image on the basis of at least one of a velocity of the first vehicle and the distance, when the controller generates the synthesized image.

6. An image display apparatus comprising:
a controller that is programmed to synthesize a first image part, which is at least a part of a rear image, and a second image part, which is at least a part of a rear side image, to generate a synthesized image, wherein the rear image is captured by a rear imager that is configured to image a rear area located at the rear of a first vehicle and the rear side image is captured by a rear side imager that is configured to image a rear side area located at the rear and the side of the first vehicle; and
a display that is configured to display the synthesized image,
the controller being programmed to vary each of a first range corresponding to the first image part in the rear image and a second range corresponding to the second image part in the rear side image on the basis of at least one of a velocity of the first vehicle and a distance between the first vehicle and a second vehicle that exists at the rear of the first vehicle, when the controller generates the synthesized image, and
the controller being further programmed to vary the first range so that the first range becomes larger as the velocity becomes lower.

7. The image display apparatus according to claim 6, wherein
the controller is programmed to vary the first range so that the first range becomes larger as the distance becomes shorter.

8. The image display apparatus according to claim 6, wherein
the controller is programmed to vary the first range so that the first range when the distance is shorter than a predetermined first threshold value is larger than the first range when the distance is longer than the first threshold value.

9. The image display apparatus according to claim 6, wherein
the controller is programmed to vary the first range so that the first range when the velocity is lower than a predetermined second threshold value is larger than the first range when the velocity is higher than the second threshold value.

* * * * *